(12) United States Patent
Halmstad et al.

(10) Patent No.: US 9,998,914 B2
(45) Date of Patent: Jun. 12, 2018

(54) USING A MOBILE DEVICE TO RESTRICT FOCUS AND PERFORM OPERATIONS AT ANOTHER MOBILE DEVICE

(71) Applicant: JAMF Software, LLC, Minneapolis, MN (US)

(72) Inventors: Richard Zachary Halmstad, Eau Claire, WI (US); Nicholas William Amundsen, Altoona, WI (US)

(73) Assignee: JAMF Software, LLC, Minneapolis, MN (US)

( * ) Notice: Subject to any disclaimer, the term of this patent is extended or adjusted under 35 U.S.C. 154(b) by 0 days. days.

(21) Appl. No.: 14/680,401

(22) Filed: Apr. 7, 2015

(65) Prior Publication Data

US 2015/0304484 A1 Oct. 22, 2015

Related U.S. Application Data

(60) Provisional application No. 62/051,791, filed on Sep. 17, 2014, provisional application No. 61/980,269, filed on Apr. 16, 2014.

(51) Int. Cl.
*H04M 1/725* (2006.01)
*H04W 4/00* (2009.01)
(Continued)

(52) U.S. Cl.
CPC ......... *H04W 8/22* (2013.01); *H04M 1/72577* (2013.01); *H04W 4/50* (2018.02);
(Continued)

(58) Field of Classification Search
CPC ......... H04M 1/72577; H04M 1/72572; H04M 11/007; H04W 48/02
See application file for complete search history.

(56) References Cited

U.S. PATENT DOCUMENTS 5,164,988 A 11/1992 Matyas et al.
5,406,261 A 4/1995 Glenn
(Continued)

FOREIGN PATENT DOCUMENTS

EP 0399667 B1 11/1996
EP 2136578 A1 12/2009
(Continued)

OTHER PUBLICATIONS

"Classroom Control Systems," <<http://wikis.ala.org/acrl/index.php/Classroom_Control_Systems>>, retrieved on Apr. 2, 2015, Association of College and Research Libraries, Chicago, IL, pp. 1-7.
(Continued)

*Primary Examiner* — Liton Miah
(74) *Attorney, Agent, or Firm* — Toler Law Group, PC

(57) ABSTRACT

A particular method includes receiving, at a manager mobile device, a selection of a managed mobile device of a plurality of managed mobile devices. The method also includes displaying, at the manager mobile device, a list of applications executable by the managed mobile device, a list of websites accessible by the managed mobile device, or both. The method further includes receiving, at the manager mobile device, a selection of an application from the list of applications or a selection of a website from the list of websites. The method includes initiating, at the manager mobile device, transmission of data to the managed mobile device instructing the managed mobile device to restrict focus to the selected application or the selected website.

30 Claims, 19 Drawing Sheets

(51) Int. Cl.
*H04W 8/22* (2009.01)
*H04W 48/02* (2009.01)

(52) U.S. Cl.
CPC ........... *H04W 48/02* (2013.01); *H04W 76/10* (2018.02); *H04M 1/72522* (2013.01); *H04M 1/72561* (2013.01); *H04M 1/72572* (2013.01)

(56) References Cited

U.S. PATENT DOCUMENTS

| | | | |
|---|---|---|---|
| 5,473,692 | A | 12/1995 | Davis |
| 5,790,664 | A | 8/1998 | Coley et al. |
| 5,825,877 | A | 10/1998 | Dan et al. |
| 6,032,257 | A | 2/2000 | Olarig et al. |
| 6,067,582 | A | 5/2000 | Smith et al. |
| 6,249,868 | B1 | 6/2001 | Sherman et al. |
| 6,385,731 | B2 | 5/2002 | Ananda |
| 6,594,765 | B2 | 7/2003 | Sherman et al. |
| 6,928,260 | B2 * | 8/2005 | Betz ............ G09B 7/02 434/307 R |
| 7,831,699 | B2 | 11/2010 | Kumar et al. |
| 7,847,789 | B2 | 12/2010 | Kolmykov-Zotov et al. |
| 8,332,878 | B2 | 12/2012 | Harm |
| 8,370,479 | B2 | 2/2013 | Hart et al. |
| 8,478,338 | B2 | 7/2013 | Sudhakar |
| 8,588,818 | B2 | 11/2013 | Huang et al. |
| 8,595,336 | B1 * | 11/2013 | Tsern et al. ............ 709/221 |
| 8,640,190 | B1 | 1/2014 | Banerjee |
| 8,671,187 | B1 * | 3/2014 | Fu ............ H04L 43/0876 709/224 |
| 9,756,049 | B2 * | 9/2017 | Soamboonsrup ........ G09B 5/08 |
| 2002/0023132 | A1 | 2/2002 | Tornabene et al. |
| 2002/0065914 | A1 | 5/2002 | Goodwin, III et al. |
| 2003/0035380 | A1 | 2/2003 | Downing et al. |
| 2003/0126137 | A1 | 7/2003 | McFadden |
| 2003/0174168 | A1 | 9/2003 | van Leersum |
| 2004/0098584 | A1 | 5/2004 | Sherman et al. |
| 2004/0147258 | A1 | 7/2004 | Dokko |
| 2004/0191744 | A1 * | 9/2004 | Guirguis ............ G09B 5/00 434/322 |
| 2005/0234931 | A1 | 10/2005 | Yip et al. |
| 2005/0262076 | A1 | 11/2005 | Voskuil |
| 2006/0099965 | A1 | 5/2006 | Aaron |
| 2007/0192720 | A1 | 8/2007 | Alsup et al. |
| 2007/0196807 | A1 * | 8/2007 | Packard ............ G09B 7/00 434/350 |
| 2008/0051076 | A1 * | 2/2008 | O'Shaughnessy et al. .. 455/419 |
| 2008/0070495 | A1 | 3/2008 | Stricklen et al. |
| 2008/0096178 | A1 | 4/2008 | Rogers et al. |
| 2008/0109754 | A1 | 5/2008 | Weinberg et al. |
| 2008/0288868 | A1 | 11/2008 | Lakey et al. |
| 2009/0122775 | A1 * | 5/2009 | Haartsen ............ 370/338 |
| 2009/0148824 | A1 * | 6/2009 | Argott ............ 434/307 R |
| 2009/0177512 | A1 | 7/2009 | Dogan et al. |
| 2009/0263777 | A1 | 10/2009 | Kohn |
| 2010/0064341 | A1 * | 3/2010 | Aldera ............ H04L 63/102 726/1 |
| 2010/0267359 | A1 | 10/2010 | Gyllensvaan |
| 2011/0078411 | A1 | 3/2011 | Maclinovsky et al. |
| 2011/0173681 | A1 | 7/2011 | Qureshi et al. |
| 2011/0274286 | A2 | 11/2011 | McCarty et al. |
| 2012/0023557 | A1 | 1/2012 | Bevan et al. |
| 2012/0072844 | A1 | 3/2012 | Lefrancois des Courtis et al. |
| 2012/0184210 | A1 | 7/2012 | Wu et al. |
| 2012/0284325 | A1 | 11/2012 | Erb |
| 2013/0029731 | A1 | 1/2013 | Fuchigami et al. |
| 2013/0035067 | A1 * | 2/2013 | Zhang ............ H04L 63/08 455/411 |
| 2013/0073326 | A1 | 3/2013 | Jordan et al. |
| 2013/0080955 | A1 | 3/2013 | Reimann et al. |
| 2013/0089849 | A1 | 4/2013 | Huang |
| 2013/0122481 | A1 | 5/2013 | Rovner |
| 2013/0212278 | A1 | 8/2013 | Marshall et al. |
| 2013/0254889 | A1 | 9/2013 | Stuntebeck |
| 2013/0281077 | A1 * | 10/2013 | Zou ............ H04L 41/5054 455/418 |
| 2013/0281084 | A1 | 10/2013 | Batada et al. |
| 2013/0290426 | A1 | 10/2013 | Sorensen |
| 2013/0297844 | A1 | 11/2013 | Rosenberg et al. |
| 2013/0304641 | A1 | 11/2013 | Dabbiere |
| 2013/0309971 | A1 | 11/2013 | Kiukkonen et al. |
| 2013/0311684 | A1 | 11/2013 | Dabbiere |
| 2013/0339512 | A1 | 12/2013 | Hjelm et al. |
| 2014/0018048 | A1 | 1/2014 | Anand et al. |
| 2014/0026062 | A1 | 1/2014 | Proudfoot et al. |
| 2014/0032635 | A1 | 1/2014 | Pimmel et al. |
| 2014/0064116 | A1 | 3/2014 | Linde et al. |
| 2014/0068778 | A1 | 3/2014 | Bhatia et al. |
| 2014/0079022 | A1 | 3/2014 | Wang et al. |
| 2014/0089111 | A1 | 3/2014 | Fernandez |
| 2014/0172908 | A1 | 6/2014 | Konik et al. |
| 2014/0189548 | A1 | 7/2014 | Werner |
| 2014/0245008 | A1 | 8/2014 | Dabbiere et al. |
| 2014/0272896 | A1 * | 9/2014 | Malik et al. ............ 434/350 |
| 2014/0280934 | A1 | 9/2014 | Reagan et al. |
| 2014/0280944 | A1 * | 9/2014 | Montgomery et al. ....... 709/225 |
| 2014/0282869 | A1 | 9/2014 | Dabbiere |
| 2014/0282894 | A1 | 9/2014 | Manton |
| 2014/0282929 | A1 | 9/2014 | Tse |
| 2014/0310772 | A1 | 10/2014 | Marshall et al. |
| 2014/0324649 | A1 | 10/2014 | Marshall et al. |
| 2014/0325204 | A1 | 10/2014 | Dabbiere |
| 2014/0330944 | A1 | 11/2014 | Dabbiere et al. |
| 2014/0330945 | A1 | 11/2014 | Dabbiere et al. |
| 2015/0055686 | A1 | 2/2015 | Hryciuk et al. |
| 2016/0037333 | A1 | 2/2016 | Amundsen et al. |
| 2016/0057020 | A1 | 2/2016 | Halmstad et al. |
| 2017/0237630 | A1 | 8/2017 | Halmstad et al. |

FOREIGN PATENT DOCUMENTS

| | | |
|---|---|---|
| EP | 2667340 A1 | 11/2013 |
| GB | 2303726 A | 2/1997 |
| WO | 9535533 A1 | 12/1995 |
| WO | 9703397 A1 | 1/1997 |
| WO | 2002099770 A1 | 12/2002 |
| WO | 2009016612 A2 | 2/2009 |
| WO | 2011022053 A1 | 2/2011 |
| WO | 2013002920 A1 | 1/2013 |

OTHER PUBLICATIONS

"Get Ready for iOS iBeacon," <<http://www.endpointprotector.com/solutions/iBeacon_for_mobile_device_management_mdm>>, retrieved on Sep. 11, 2014, CoSoSys, Cluj-Napoca, Romania, pp. 1-3.

"How to Lock an App on iPad, iPod, or iPhone," <<http://luv2teachgirl.blogspot.com/2012/10/how-to-lock-app-on-ipad-ipod-or-iphone.html>>, retrieved on Apr. 2, 2015, pp. 1-4.

"Manage Devices and Content in the Classroom," <<https://www.apple.com/education/it/>>, retrieved on Apr. 2, 2015, Apple, Inc., Cupertino, CA, pp. 1-4.

"SMART Sync classroom management software," <<http://smarttech.com/Solutions/Education+Solutions/Products+for+education/Software/SMART+Sync>>, retrieved on Mar. 26, 2014, Smart Tech, Calgary Alberta, pp. 1-3.

"Teacher's Assistant for the iPad," <<http://www.lanschool.com/ipad>>, retrieved on Apr. 2, 2015, Stoneware, Indianapolis, Indiana, pp. 1-3.

"Vision6 Classroom Management Software," <<www.act4networks.com/Documents/Vision6_Brochure.pdf>>, retrieved on Apr. 2, 2015, ACT Network Solutions, 4 pages.

Kahn, J., "BeHere App uses iBeacons to Automatically Take Attendance as Students Enter the Classroom," <<http://9to5mac.com/2014/03/28/behere-app-uses-ibeacons-to-automatically-take-attendance-as-students-enter-the-classroom/>>, retrieved on Apr. 1, 2015, 9to5Mac.com, pp. 1-3.

Perez, S., "BeHere Lets Teachers Take Attendance Using iBeacon Technology," <<http://techcrunch.com/2014/03/28/behere-lets-teachers-take-attendance-using-ibeacon/>>, retrieved on Apr. 2, 2015, Techcrunch.com, pp. 1-3.

(56) References Cited

OTHER PUBLICATIONS

"Download iBeacons Bible 1.0", retrieved from <<https://meetingofideas.files.wordpress.com/2013/12/12/download-ibeacons-bible-1-0/>>, Dec. 12, 2013, Gaia-Matrix, 4 pages.
Cavallini, A., "iBeacons Bible 1.0", retrieved from <<https://meetingofideas.files.wordpress.com/2013/12/ibeacons-bible-1-0.pdf>>, Dec. 12, 2013, Gaia-Matrix, pp. 1-14.
Netherlands Search Report, Netherlands Application No. 2014620, dated Dec. 2, 2015, 15 pages.
International Search Report and Written Opinion for International Application No. PCT/US15/25361, ISA/US, dated Sep. 14, 2015, 16 pages.
Invitation to Pay Additional Fees and, Where Applicable, Protest Fee for International Application No. PCT/US15/25361, ISA/US, dated Jul. 6, 2015, 2 pages.
"Configuring Distribution Point Groups in Configuration Manager", TechNet Blogs, Feb. 1, 2012, Microsoft Corporation, Redmond, Washington, 1 page.
Griswold, M., "The best group is a DP group!", Michael Griswold's SCCM Tips and Tricks, TechNet Blogs, Mar. 8, 2013, Microsoft Corporation, Redmond, Washington, 1 page.
John, V., "Configuration Manager 2012: Content Management," TechNet Blogs, Apr. 4, 2011, Microsoft Corporation, Redmond, Washington, 3 pages.
Netherlands Search Report, Netherlands Application No. 2016522, dated Feb. 3, 2017, 10 pages.
Partial Netherlands Search Report, Netherlands Application No. 2016521, dated Feb. 6, 2017, 14 pages.
Partial Supplementary European Search Report for EP Application No. 15779599.8, dated Sep. 11, 2017, 16 pages.
Netherlands Search Report, Netherlands Application No. 2019161, dated Oct. 3, 2017, 8 pages.
Sherman, et al., USPTO Application Data for "Method and System For Embedded, Automated Component-Level Control Of Computer Systems," U.S. Appl. No. 09/047,975, filed Mar. 25, 1998, 1 page.
Supplementary European Search Report for EP Application No. 15779599.8, dated Jan. 4, 2018, 14 pages.

* cited by examiner

Class Name: 1st Period Math
Class Time Period: 8:00AM – 8:50AM

Class Enrollment:

| GUID | Nickname |
|---|---|
| 12345 | Bobby's Tablet |
| 67890 | Jane's Tablet |
| 33344 | Nick's Tablet |

Class Sub-Groups: N/A

— 210

Class Name: 2nd Period Science
Class Time Period: 9:00AM – 9:50AM

Class Enrollment:

| GUID | Nickname |
|---|---|
| 12345 | Bobby's Tablet |
| 98765 | Diane's Tablet |
| 24680 | Sally's Tablet |
| 13579 | Boyd's Tablet |
| 88842 | Phillip's Tablet |
| 00007 | Janet's Tablet |

Class Sub-Groups:

| Group ID | Member GUIDs |
|---|---|
| 1 | 12345, 24680 |
| 2 | 13579, 00007 |
| 3 | 88842, 98765 |

Figure 14:
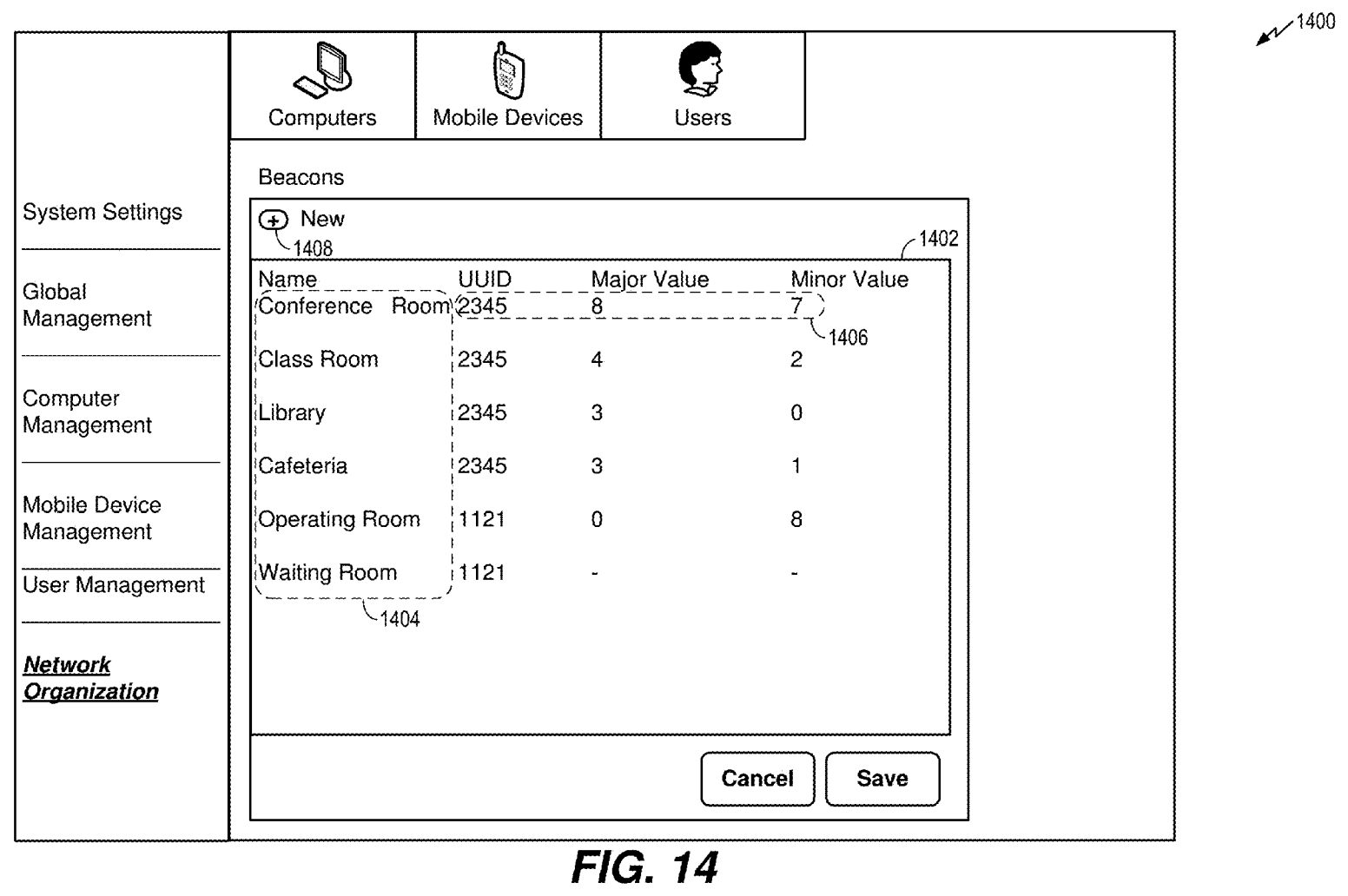

System Settings

| Computers | Mobile Devices | Users |

Global Management
Computer Management
Mobile Device Management
User Management

*Network Organization*

Beacons — 1402

⊕ New — 1408

| Name | UUID | Major Value | Minor Value |
|---|---|---|---|
| Conference Room | 2345 | 8 | 7 — 1406 |
| Class Room | 2345 | 4 | 2 |
| Library | 2345 | 3 | 0 |
| Cafeteria | 2345 | 3 | 1 |
| Operating Room | 1121 | 0 | 8 |
| Waiting Room | 1121 | - | - |

— 1404

[ Cancel ]  [ Save ]

Tabs: Computers (1604) | Mobile Devices (1606) | Users (1610)

Sidebar:
- Search Inventory
- Licensed Software
- _Rules_
- Smart Computer Groups
- Static Computer Groups
- Enrollment Invitations
- Management Settings Name
- Conference Room [Add] 1620
- Class Room [Add] 1620
- Library [Add] 1620
- Cafeteria [Add] 1620

[Cancel] [Save]

USING A MOBILE DEVICE TO RESTRICT FOCUS AND PERFORM OPERATIONS AT ANOTHER MOBILE DEVICE

CROSS-REFERENCE TO RELATED APPLICATIONS

The present application claims priority from U.S. Provisional Patent Application No. 61/980,269, filed Apr. 16, 2014 and entitled "USING A MOBILE DEVICE TO RESTRICT FOCUS AND PERFORM OPERATIONS AT ANOTHER MOBILE DEVICE", and from U.S. Provisional Patent Application No. 62/051,791, filed Sep. 17, 2014 and entitled "DEVICE MANAGEMENT BASED ON WIRELESS BEACONS", the contents of each of which are incorporated herein in their entirety.

BACKGROUND

Mobile devices are becoming increasingly prevalent in everyday use, including in home, office, and educational environments. For example, school districts around the world are starting to implement one-to-one technology programs that provide each student access to a mobile device, such as a tablet computer. As another example, many corporations provide employees with mobile devices to perform job-related functions on-the-go. To maintain control of the devices a school or corporation may rely on information technology (IT) administrators that maintain a roster of devices and statuses of each device. As an illustrative, non-limiting example, maintaining control of devices in the classroom may include preventing students from accessing unauthorized materials. However, relying on IT administrators for all mobile device management (MDM) may be inefficient and expensive. In some examples, based on a global positioning system (GPS) receiver of the device, an IT administrator may enforce device policies when the device is at school or at work but not when the device is away from school or work. However, using GPS may place considerable drain on a power source of the device. Further, using GPS may compromise privacy of a user of the device by providing the IT administrator an accurate location of the device (and thus the student or employee) at all times.

SUMMARY

In particular aspects, the present disclosure provides systems and methods that enable a "manager" or "primary" mobile device to perform selected MDM functions with respect to one or more "managed" or "secondary" mobile devices. For example, in an educational context, the manager mobile device may be a tablet computer operated by a teacher and the managed mobile devices may be tablet computers operated by students. By empowering a teacher to perform certain MDM functions, an overall mobile device experience in the classroom may be improved. For example, teachers may no longer have to communicate with IT administrators for relatively minor issues. For example, a teacher may use his or her mobile device to restrict "focus" at student mobile device(s). To illustrate, the teacher may instruct particular student devices to remain within a particular application or at a particular website. As another example, the teacher may clear a passcode from a student mobile device, so that the student can use the mobile device and participate in the class instead of becoming a distraction to other students. As yet another example, the teacher may initiate a screen mirroring session between a student device and an external display device. The described techniques may also notify the teacher of the battery status of the student devices, so that the teacher can charge student devices as needed. At the end of class, the teacher may clear student device restrictions. As another option, student device restrictions may be automatically cleared at the end of class in case the teacher forgets to clear the student device restrictions.

In particular aspects, the present disclosure provides systems and methods that enable a device management server to maintain and enforce policies based on a detected location of a managed device. Advantageously, the present disclosure may provide device management capability with reduced power drain and increased privacy as compared to using GPS-based systems and methods. For example, the device management server may determine a location of a particular managed device based on a message received from the particular managed device indicating which wireless beacon (or multiple wireless beacons) is detected by the particular managed device. To illustrate, when a student is in a classroom, the student's device (e.g., a phone or a tablet computer) may detect a wireless beacon associated with the classroom (e.g., "science class wireless beacon #1") via a first wireless connection. As used herein, a "wireless connection" may correspond to one-way or two-way communication via a wireless medium using a particular wireless technology. The wireless beacon may be inside of or relatively close to the classroom. For example, the wireless beacon may broadcast via a personal area network connection or other short range connection, such as Bluetooth® low energy (BLE) (Bluetooth is a registered trademark of Bluetooth SIG, Inc. of Kirkland, Wash.). In response to detecting the wireless beacon, the student's device may transmit, via a second wireless connection, a message to the device management server indicating that the student's device has detected the wireless beacon. For example, the first message may be transmitted by the device via an Institute of Electrical and Electronics Engineers (IEEE) 802.11 connection, a third generation (3G) connection, a fourth generation (4G) connection, etc. In response, the device management server may transmit a message to the device to enforce a policy associated with the classroom. The policy may grant the device access to functionality that was inaccessible to the device before when the wireless beacon was detected. As an illustrative non-limiting example, the device may be granted access to a printer located in the classroom.

The functionality (e.g., the ability to communicate with the printer) may remain accessible to the device while the device is in range of the wireless beacon. For example, when the device no longer detects (e.g., the device can no longer interpret an identifier carried by the signal) the wireless beacon, the device may transmit a message to the device management server indicating that the device no longer detects the wireless beacon. Alternatively, such a message may be transmitted in response to receiving a new beacon signal that is stronger than a signal of the wireless beacon or in response to detecting that a signal strength of the signal received from the wireless beacon is below a threshold. In response to the device indicating that the wireless beacon is no longer detected, the device management server may transmit message to the device instructing the device to no longer enforce the policy (e.g., revoking access to the printer).

It should be noted that although various embodiments may be described herein with reference to educational or corporate settings, these are examples only and are not to be considered limiting. The teachings of the present disclosure

BRIEF DESCRIPTION OF THE DRAWINGS

FIG. 2 is a diagram that illustrates enrollment and grouping data of the system of FIG. 1;

FIG. 14 illustrates a particular example of a graphical user interface (GUI) associated with managing functionality of a managed device based on proximity to a wireless beacon;

FIG. 16 illustrates another particular example of a GUI associated with managing functionality of a managed device based on proximity to a wireless beacon;

DETAILED DESCRIPTION

Figure 1:
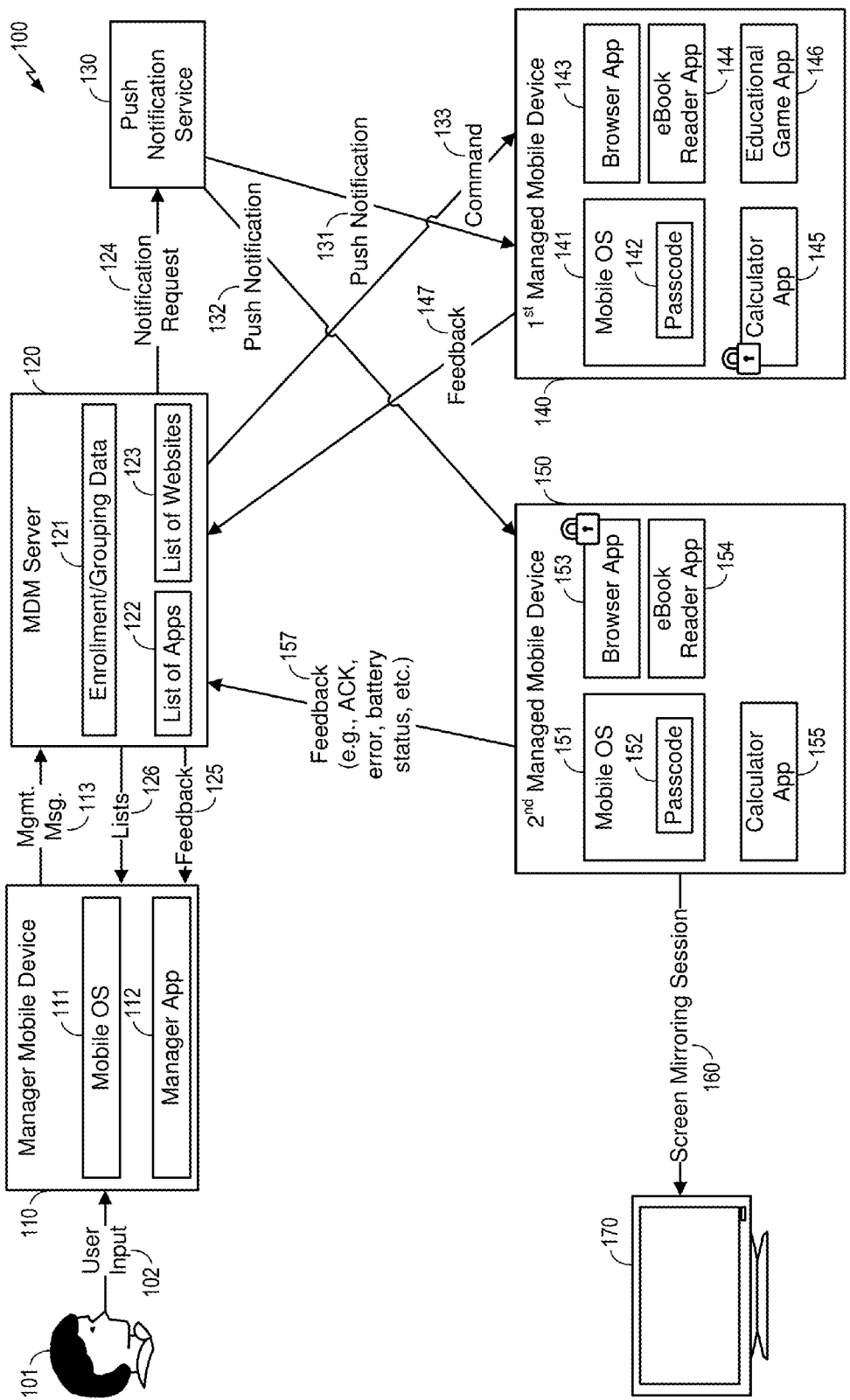
FIG. 1 is a diagram of a particular embodiment of a system that is operable to enable a manager mobile device to control operation of managed mobile devices.

Referring to FIG. 1, a particular embodiment of a system that is operable to enable a manager mobile device 110 to control operation of managed mobile devices 140, 150 is shown and generally designated 100. It should be noted that although one manager mobile device 110 and two managed mobile devices 140, 150 are shown in FIG. 1, the present disclosure is not limited to any particular configuration or number of devices. In alternate embodiments, a different number of manager mobile devices and/or managed mobile devices may be present.

Each of the mobile devices 110, 140, 150 may be a portable computing device with wireless networking capability. In an illustrative embodiment, the mobile devices 110, 140, 150 are tablet computers, mobile phones, laptop computers, portable media players, electronic book (eBook) readers, or any combination thereof.

The manager mobile device 110 may include a mobile operating system (OS) 111. The mobile OS 111 may control functions of the manager mobile device 110, such as input/output (e.g., a touchscreen display, speaker, microphone, camera, etc.) and networking (e.g., cellular, Bluetooth, Wi-Fi, global positioning system (GPS), etc.). The mobile OS 111 may also provide mobile applications (apps) access to mobile device resources. Examples of mobile device apps include, but are not limited to, web browser, e-mail, calendar, social networking, document/eBook reader, media player, etc. Mobile apps may correspond to software instructions that are stored in a memory of the mobile device 110 and executed by a processor of the mobile device 110, hardware circuits that implement app functionality, or both. In the example of FIG. 1, the manager mobile device 110 includes a manager app 112. As further described herein, the manager app 112 may enable a user 101 of the manager mobile device 110 to control, via user input 102, selected functions of the managed mobile device 140, 150.

The system 100 also includes a mobile device management (MDM) server 120. The MDM server 120 may correspond to hardware and/or software that implement MDM functions. For example, in an educational context, the MDM server 120 may manage teacher and student mobile devices. In a particular embodiment, the MDM server 120 stores (or has access to) enrollment and grouping data 121. The data 121 may include enrollee data identifying all mobile devices that are managed by the MDM server 120, such as data regarding the manager mobile device 110, the first managed mobile device 140, and the second managed mobile device 150. The data 121 may also include data that classifies managed mobile devices into groups or subgroups, so that the managed mobile devices can be managed individually or as part of a larger group or subgroup. In an educational context, the data 121 may include a list of all student devices, lists of student devices corresponding to a particular class (e.g., all student devices of a particular school or school district), lists of student devices in subgroups (e.g., lab partner groups or homework/project groups) within a particular class, etc. An illustrative embodiment of enrollment and grouping data is further described with reference to FIG. 2.

It should be noted that although various embodiments may be described herein with reference to educational settings, this is for example only and not to be considered limiting. The teachings of the present disclosure may be applied in other mobile device environments, including but not limited to home environments, corporate environments, retail environments, etc. For example, a parent may use their mobile device to perform MDM functions on mobile devices operated by children. As another example, a person making a presentation in a corporate environment may use their mobile device to direct mobile devices operated by presentation attendees to perform certain functions. As yet another example, a retail store owner or manager may restrict focus of demonstration devices/kiosks within the retail store to a particular demonstration application or website.

The MDM server 120 may store or have access to a list of applications 122 and a list of websites 123, which may be used by the manager mobile device 110 to restrict focus at the managed mobile devices 140, 150. Restricting focus to an application may include activating the application, ignoring or disabling user input (e.g., touchscreen or button input) that deactivates the application, and ignoring or disabling user input that activates another application. Restricting focus to a website may include navigating to the website (e.g., via a browser application) and ignoring or disabling user input that deactivates the browser application or navigates away from the website. In an illustrative embodiment, restricting focus to an application or a website may also disable certain user interface (UI) elements at a managed mobile device, such as e-mail or instant message notifications. Restricting focus may also include automatically terminating execution of one or more other applications or processes (e.g., background processes) at a managed mobile device.

The first managed mobile device 140 may include a mobile OS 141, which may be an instance of the same mobile OS as the mobile OS 111 or an instance of a different mobile OS. In a particular embodiment, the mobile OS 141 stores a passcode 142. For example, the passcode 142 may be used to secure access to the first managed mobile device 140. When a user (e.g., student) attempts to operate the first managed mobile device 140, the user may be prompted to input a passcode, and access to the first managed mobile device 140 may not be enabled unless the input passcode matches the stored passcode 142. The first managed mobile device 140 may also include one or more apps. The apps may be pre-installed (e.g., as part of or along with the mobile OS 141) or may be installed after being downloaded (e.g., via an app storefront). In the example of FIG. 1, which corresponds to an educational setting, the apps include a browser app 143, an eBook reader app 144, a calculator app 145, and an educational game app 146.

The second managed mobile device 150 may also include a mobile OS 151 with a passcode 152, a browser app 153, an eBook reader app 154, and a calculator app 155. However, as shown in FIG. 1, the second managed mobile device 150 does not have the educational game app 146 installed.

During operation, the user 101 (e.g., a teacher) may provide the user input 102 to the manager app 112 to perform certain MDM functions with respect to the managed mobile devices 140, 150. In an illustrative embodiment, the user 101 may be prompted for authentication credentials (e.g., a username, a password, a uniform resource locator (URL) of the MDM server 120, etc.) prior to being granted access to the manager app 112. The authentication credentials may be verified by the manager mobile device 110, the MDM server 120, or both. In a particular embodiment, communication between the various components of the system 100 occurs via secure (e.g., encrypted) channels. For example, communication in the system 100 may occur via encrypted internet protocol (IP) connections.

As a first example of operation, the manager app 112 may execute a "focus lock" workflow that enables the user 101 to restrict focus at the managed devices 140, 150. To illustrate, the manager app 112 may display a list of managed mobile devices, including the managed mobile devices 140, 150, that are accessible to the user 101. Different mobile devices may be accessible to the user 101 at different times. For example, different student devices may be accessible to different teachers at a school depending on which classes students are enrolled in.

The user 101 may select one or more managed mobile devices from the list of accessible managed mobile devices. For example, the user 101 may select the first managed mobile device 140. In response, the manager app 112 may display the list of apps 122 and the list of websites 123. The list of managed mobile devices, the list of apps 122, and the list of websites 123 are collectively illustrated as being provided to the manager mobile device 110 as lists 126. The user 101 may select a particular app or website, indicating that focus at the first managed mobile device 140 is to be restricted to the particular app or website. For example, the user 101 may select a calculator app. In response, the manager mobile device 110 may send a management message 113 to the MDM server 120. The management message 113 may include data identifying the first managed mobile device 140, the selected app or website, and a "restrict focus" command.

In response to receiving the management message 113, the MDM server 120 may send a notification request 124 to a push notification service 130. The push notification service 130 may correspond to one or more network accessible servers that are configured to send push notifications 131, 132 to the managed mobile devices 140, 150. In a particular embodiment, the push notifications 131, 132 may cause the managed mobile devices 140, 150 to check with the MDM server 120 to see if there are any commands to be performed by the managed mobile devices 140, 150. For example, commands selected by the user 101 via the manager mobile device 110 may be queued by the MDM server 120 and may be retrieved by the managed mobile devices 140, 150 in response to the push notifications 131, 132. In FIG. 1, the first managed mobile device 140 retrieves a command 133 (e.g., the command to restrict focus to the calculator app 145) in response to the push notification 131. In an alternate embodiment, the push notifications 131, 132 may include or identify the command to be performed by the managed mobile devices 140, 150. For example, the push notifications 131 may utilize an application programming interface (API) of the mobile OS 141 to instruct the first managed mobile device 140 to restrict focus to the calculator app 145 (e.g., while a student that is using the first managed mobile device 140 takes a math test). In yet another alternate embodiment, a notification or a command may be pushed by the MDM server 120 or may be communicated directly from a manager mobile device to a managed mobile device (e.g., via a device-to-device (D2D) connection). In an illustrative embodiment, the command is recognized and executed by a managed mobile device. For example, when the managed mobile device is an iOS® device, the command may be compatible with an iOS® MDM API/protocol, such as a device lock command, a clear passcode command, etc. (iOS is a registered trademark of Cisco Systems, Inc. of San Jose, Calif. and is used by Apple Inc. of Cupertino, Calif. under license).

After the first managed mobile device 140 has restricted focus to the calculator app 145 (illustrated in FIG. 1 by a lock designator), the first managed mobile device 140 may send feedback 147 to the MDM server 120 including an acknowledgement (ACK). Different managed mobile devices may be locked to different applications or websites. In the example of FIG. 1, the second managed mobile device 150 is locked to the browser app 153. If a managed mobile device is unable to restrict focus to a selected app, feedback from the managed mobile device may include an error message or code. For example, feedback 157 from the second managed mobile device 150 may include an error if the user 101 attempts to restrict focus to an uninstalled app (e.g., an educational game app). The MDM server 120 may forward selected feedback from managed mobile devices to the manager mobile device 110, illustrated in FIG. 1 as feedback 125. Based on the feedback 125, the manager app 112 may update an interface to indicate statuses of different managed mobile devices, as further described with reference to FIGS. 5-9. In a particular embodiment, the user 101 may provide input to the manager app 112 that causes a managed mobile device to automatically obtain (e.g., download and install) and restrict focus to an app. For example, if the feedback 125 indicates that a managed mobile device does not have a particular app installed, the user 101 may select an "obtain app" option in the manager app 112 to cause the managed mobile device to download the app.

Although certain embodiments and workflows are described herein with reference to performing MDM for a single managed device, it should be understood that MDM may also be performed for multiple devices. For example, the user 101 may select multiple managed devices or a group of managed devices via the manager app 112. The management message 113 may identify multiple managed devices or a group of managed devices, and the push notification service 130 may send push notifications to each managed device.

In another example of operation, the manager app 112 may execute a "focus unlock" workflow that enables the user 101 to stop restricting focus at a managed device. After selecting one, multiple, or a group of managed devices, the user 101 may select an option in the manager app 112 corresponding to a "focus unlock" command. In this example, the management message 113 identifies the selected managed device(s) and the "focus unlock" command. The push notification service 130 sends push notification(s) to the selected managed device(s) to cause the managed device(s) to clear previously implemented focus restrictions. For example, the push notification(s) may use an API at the managed mobile device(s) to unrestrict focus at the managed mobile device(s). To illustrate, at the end of class, a teacher may clear focus restrictions at all student devices, so that the student devices are not restricted at the start of the next class. In a particular embodiment, focus restrictions may be automatically cleared in case the teacher forgets to clear focus restrictions. For example, the MDM server 120 may store data identifying a start time and an end time of a class period, and may automatically initiate the clearing of focus restrictions at the end of the class period. A focus restriction at a managed mobile device may also be cleared if feedback from the managed mobile device indicates that the managed mobile device has moved to a different location, such as a location outside the school or outside a particular classroom.

In a particular embodiment, a teacher may trigger the "focus unlock" workflow by indicating that a particular student is absent from class, so that if a student is sick at home, focus at the student's mobile device is not restricted to any particular app or website. Alternatively, or in addition, a student device may be automatically removed based on location data (e.g., GPS data, cellular triangulation, proximity to a particular location or device, etc.) indicating that the student is absent from the class.

In another example of operation, the manager app 112 may execute a clear passcode workflow. Occasionally, a student may forget the passcode for his or her mobile device. Alternatively, a classmate may also set or reset the passcode of the student's mobile device. In such situations, if the passcode is not reset, the student may become a distraction to the rest of the class because the student is unable to use the mobile device. Instead of a teacher contacting IT support, the system 100 advantageously enables the teacher to clear the passcode on the student's device. For example, the teacher (e.g., the user 101) may select the student's device and select a "clear passcode" command. The management message 113 may identify the selected student device and the "clear passcode" command, and the push notification service 130 may send a push notification to the student device to cause (e.g., via an API) the student device to clear any previously set passcode.

As another example of operation, the manager app 112 may execute a screen mirroring workflow. The user 101 may provide user input 102 that causes a particular managed mobile device to initiate a screen mirroring session with an external display device. For example, a teacher may have the screen of a student's device mirrored to an external display screen, so that classmates can see the student's interactions with an app (e.g., other students can follow along as the student solves a math problem). In the embodiment of FIG. 1, the second managed mobile device 150 is in a screen mirroring session 160 with an external display device 170, such as a projector, a television, a digital media player, etc. A teacher may also initiate a screen mirroring session between his or her own mobile device (e.g., the manager mobile device 110) and an external display. For example, a teacher may initiate a screen mirroring session to show students how to use certain apps or to display a document to all students in a class.

As another example of operation, the manager app 112 may execute an "obtain file" workflow. To illustrate, a teacher may distribute a file, such as a homework assignment or reading material, to one or more student mobile devices during class. The file may include at least a portion of an image, a document, audio content, video content, an eBook, an electronic learning (e-learning) lesson, etc. Providing the file to a managed device may include sending the file to the managed device or instructing the managed device to download the file from an external server or online content repository. For example, a push notification, a command, or other message to a managed mobile device may include a file or a download URL for the file.

In a particular embodiment, the managed mobile devices 140, 150 are configured to provide status updates to the MDM server 120 via the feedback 147, 157. For example, the status updates may include battery life status information. When the battery life of a particular managed mobile device is less than a threshold, the manager app 112 may present an alert to the user 101 (e.g., to cause the user to charge the particular managed mobile device).

The system 100 of FIG. 1 may thus support various workflows that enable the user 101 of the manager mobile device 110 to restrict focus and cause other operations to be performed at the managed mobile devices 140, 150. Being able to use the manager mobile device 110 to perform such MDM operations saves time and effort as compared to having to contact IT personnel. For example, in an educational setting, a teacher may be empowered to quickly control student mobile devices without leaving the classroom or interrupting class time to obtain IT support.

Referring to FIG. 2, a particular embodiment of the enrollment and grouping data 121 of FIG. 1 is shown and generally designated 200. In the illustrated example, first data 210 is associated with a first class and second data 220 is associated with a second class.

The first data 210 corresponds to a class named "1$^{st}$ Period Math" that has a class time period of 8:00 AM to 8:50 AM. Class enrollment for the class includes three students:

Bobby, Jane, and Nick. Each of the students has a tablet device. For example, Bobby has a tablet nicknamed "Bobby's Tablet" that has a globally unique identifier (GUID) 12345. Similarly, "Jane's Tablet" has a GUID 67890 and "Nick's Tablet" has a GUID 33344. The manager app 112 of FIG. 1 may display device nicknames, device GUIDs, or both. Similarly, the management message 113 and the notification request 124 of FIG. 1 may identify managed devices by device nickname, device GUID, or both. The students in the class are not divided into any subgroups.

The first data 220 corresponds to a class named "$2^{nd}$ Period Science" that has a class time period of 9:00 AM to 9:50 AM. Class enrollment for the class includes six students: Bobby, Diane, Sally, Boyd, Phillip, and Janet. Each of the students has a tablet device. The students in the class are divided into three subgroups (e.g., subsets) having group identifiers (IDs) 1, 2, and 3, respectively. In a particular embodiment, when a MDM operation is performed for each device of a group, the management message 113 includes the group ID of the group.

It should be noted that the data 210, 220 shown in FIG. 2 is not to be considered limiting. In alternate embodiments, enrollment and grouping data may include data for more or fewer students, more or fewer classes, more or fewer groups, etc. All or a portion of the data shown in FIG. 2 may be sent by the MDM server 120 to the managed mobile device 140 during operation of the manager app 112.

FIGS. 3-9 illustrate particular embodiments of interfaces that may be displayed by the manager mobile device 110 and/or the managed mobile devices 140, 150 of FIG. 1 during operation in an educational setting. In alternate embodiments, different interfaces may be displayed.

Figure 3:
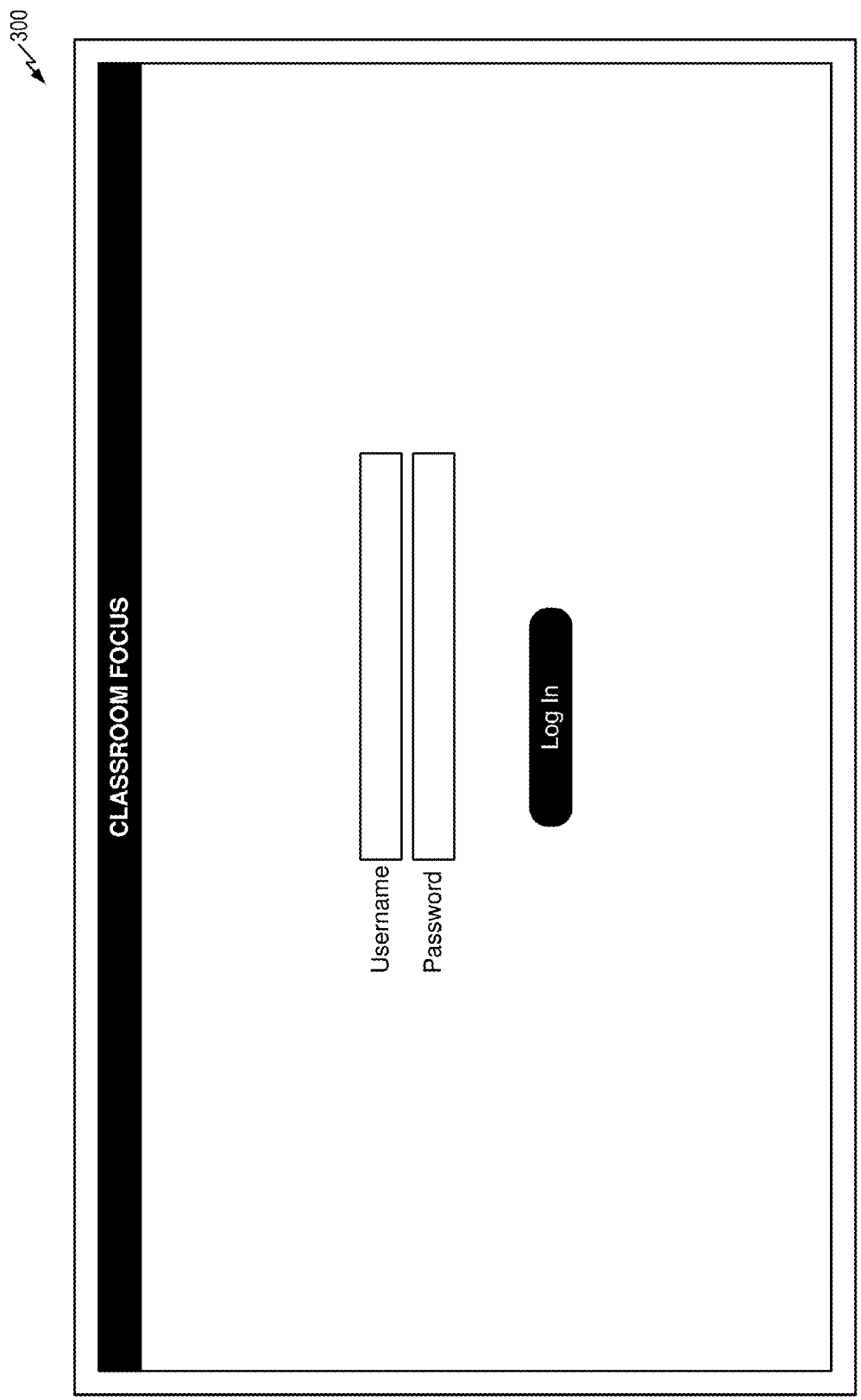
FIG. 3 illustrates a particular embodiment of a login interface.
Figure 4:
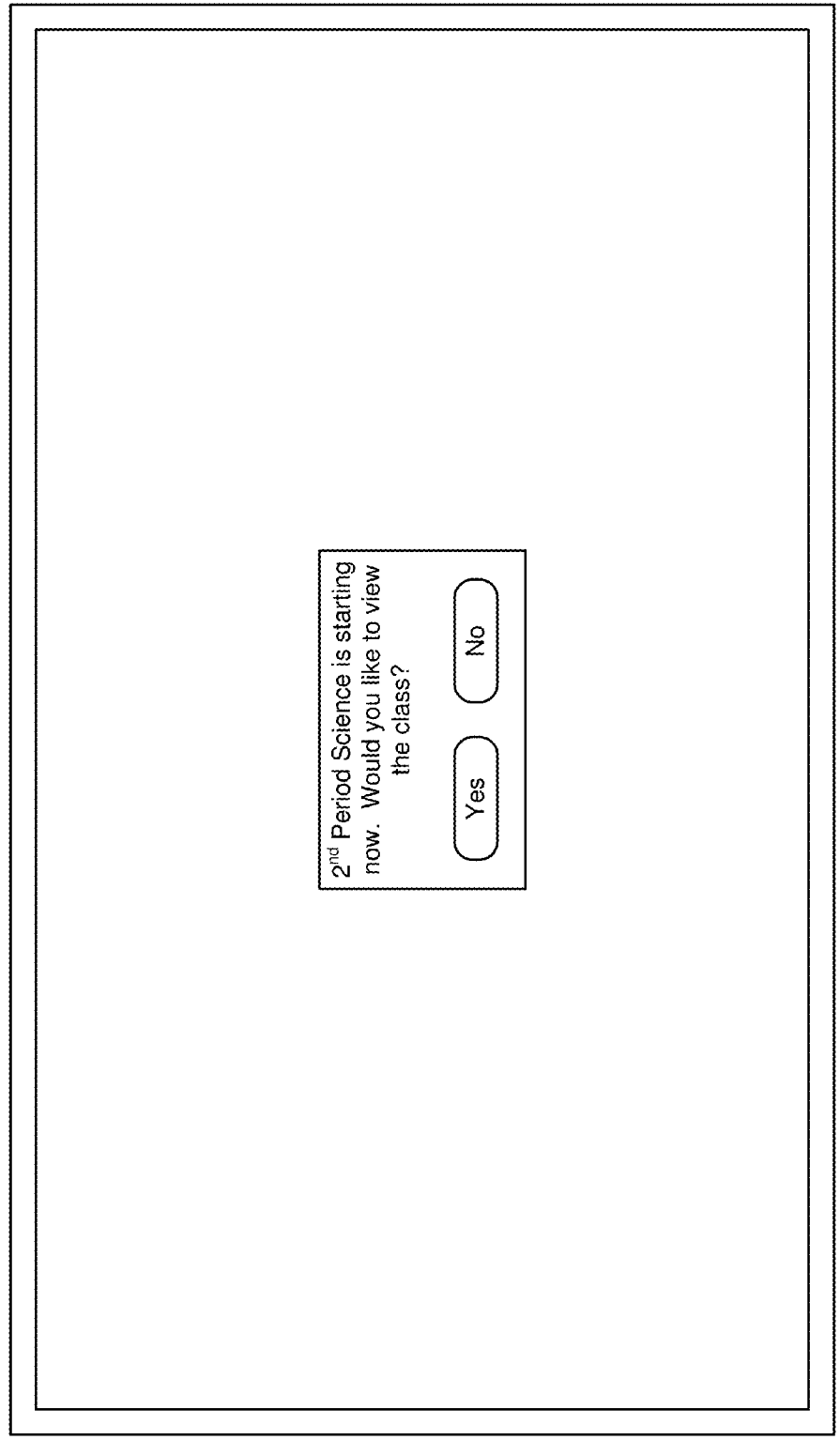
FIG. 4 illustrates a particular embodiment of a reminder interface.

In particular, FIG. 3 illustrates a login interface 300 that may be displayed when the user 101 starts the manager app 112 (entitled "CLASSROOM FOCUS"). In a particular embodiment, the manager app 112 may be started in response to the user 101 pressing a "Yes" button on a reminder indicating that a class is about to begin, as shown in a reminder interface 400 of FIG. 4.

Figure 5:
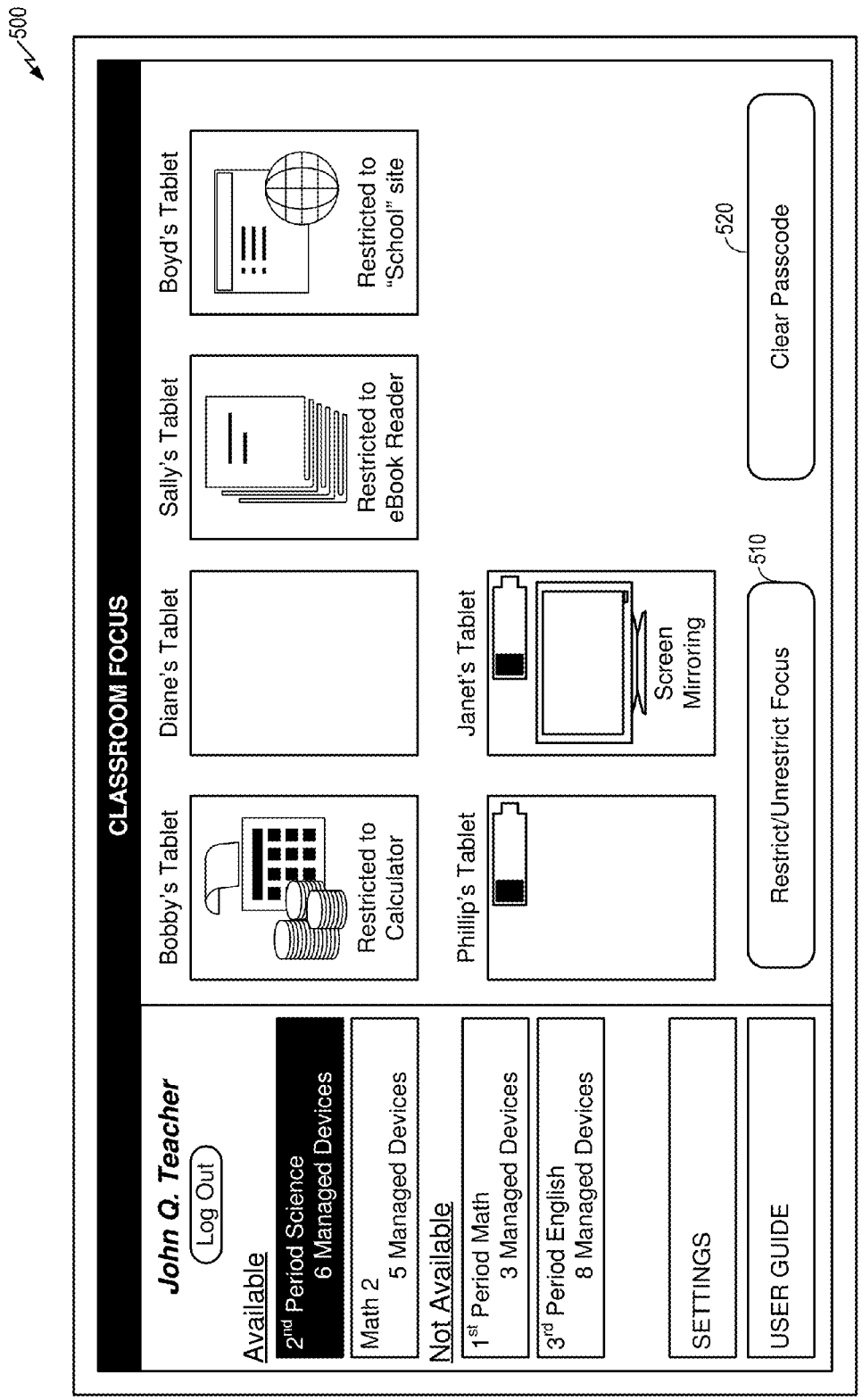
FIG. 5 illustrates a first particular embodiment of a management interface (e.g., of a teacher device)

Referring to FIG. 5, a particular embodiment of a manager interface 500 is shown. The manager interface 500 may display "Available" and "Not available" classes. For a particular teacher, available classes may correspond to classes that the teacher has taught in the past or is enrolled (e.g., at the MDM server 120 of FIG. 1) to teach. A class may only be available during the time period of the class (e.g., the "$2^{nd}$ Period Science" class of FIG. 2 may only be available between 9 AM and 9:50 AM on weekdays). Classes that are not available may be listed under the "Not Available" heading, as shown. In the example of FIG. 5, the entry for each class indicates a number of managed devices. The manager interface 500 also includes selectable options for app settings and a user guide, as shown.

In FIG. 5, the entry for "$2^{nd}$ Period Science" is selected. In response, the manager app 112 shows icons corresponding to the six managed devices enrolled in the "$2^{nd}$ Period Science" class. Each icon may indicate an MDM status of the corresponding student device. For example, Bobby's Tablet is restricted to the calculator app and Sally's Tablet is restricted to the eBook Reader app. Boyd's tablet is restricted to a "school" website and Janet's tablet is in a screen mirroring session. Device icons may also indicate whether a device has low battery life (e.g., less than a threshold). In the illustrated example, Phillip's Tablet and Janet's Tablet are indicated as having low battery life.

The manager interface 500 also includes a restrict/unrestrict focus button 510 and a clear passcode button 520. To restrict or unrestrict focus at a particular student device, a teacher may select the student device and tap the button 510. For example, selecting the Diane's Tablet icon followed by the button 510 may display the interface 600 of FIG. 6. Using the interface 600, the teacher may restrict focus on Diane's Tablet to a particular app. The list of available apps may correspond to the list of apps 122 of FIG. 1. Selection of a clear focus button 602 may clear focus restrictions at Diane's Tablet. Alternately, the teacher may select a "Focus on Website" tab to show the interface 700 of FIG. 7 and the teacher may then select a particular website from a list of websites corresponding to the list of websites 123 of FIG. 1. In a particular embodiment, a list of applications (e.g., the list of FIG. 6), a list of websites (e.g., the list of FIG. 7), a list of eBooks, etc. displayed by a teacher's mobile device is sorted based on frequency of use. When focus at Diane's Tablet is successfully restricted to a selected app or website, the teacher's mobile device may receive an acknowledgement. For example, as shown by interface 800 of FIG. 8, the icon for Diane's Tablet may be transformed to indicate that Diane's Tablet is locked to the eBook Reader app.

The clear passcode button 520 of FIG. 5 may be selected to clear the passcode of one or more student devices. For example, to clear the passcode on Bobby's Tablet, the teacher may select the icon for Bobby's Tablet and the clear passcode button 520. In response, the interface 900 of FIG. 9 may be displayed, including confirmation that a clear passcode command was sent to Bobby's Tablet. To select multiple managed devices, a teacher may select an icon for one of the managed devices for a time period that exceeds a "long-tap" threshold, which causes checkboxes to be displayed for each icon. The teacher may select checkboxes corresponding to multiple managed devices. For example, in the embodiment shown in FIG. 8, the teacher has selected Boyd's Tablet and Janet's Tablet via checkboxes 801 and 802, respectively. In a particular embodiment, a "Select All" button may also be displayed by a manager app (e.g., the manager app 112 of FIG. 1) to select all accessible managed mobile devices (e.g., all student devices in a class).

Figure 10:
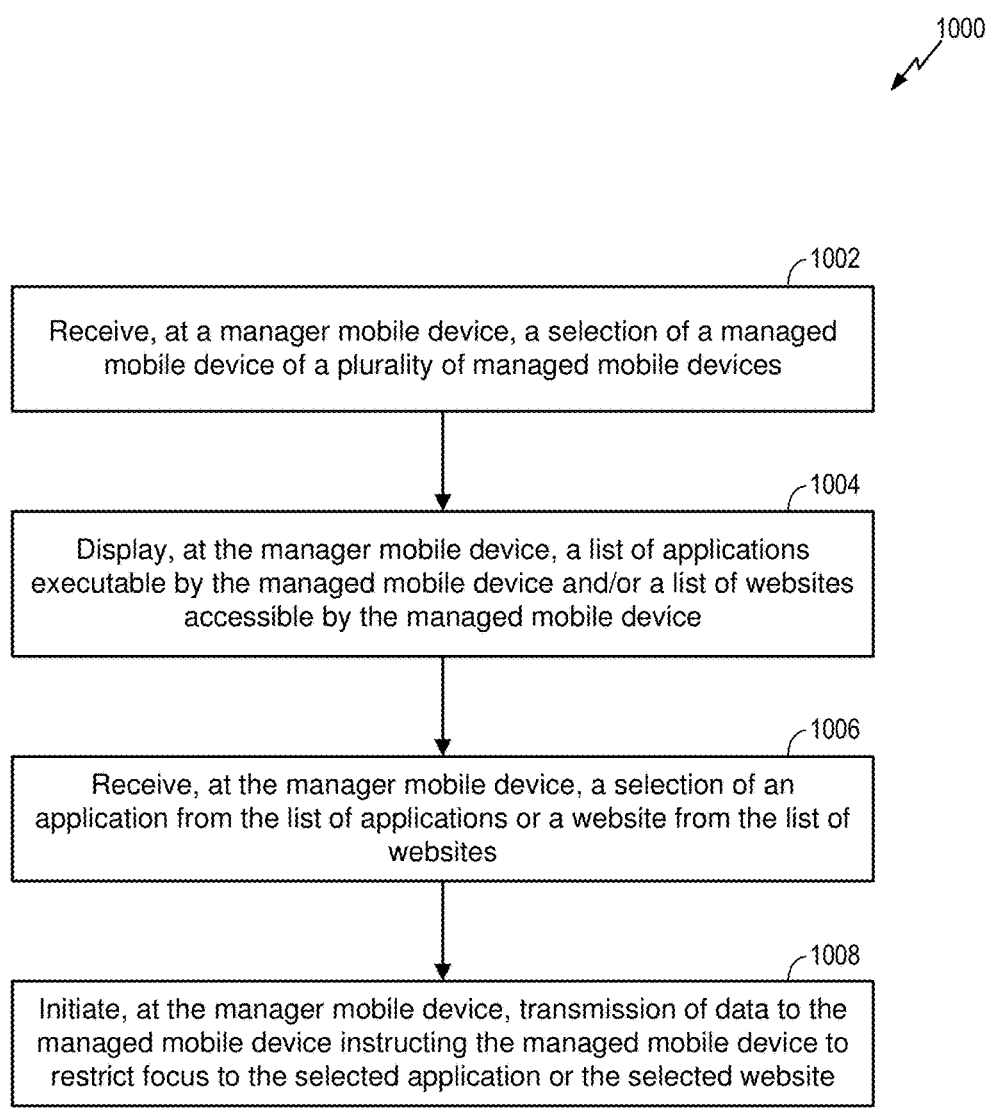
FIG. 10 is a flowchart to illustrate a particular embodiment of a method of operation at a manager mobile device.

Referring to FIG. 10, a particular embodiment of a method of operation at a manager mobile device is shown and generally designated 1000. In an illustrative embodiment, the method 1000 may be performed by the manager mobile device 110 of FIG. 1.

The method 1000 includes receiving, at a manager mobile device, a selection of a managed mobile device of a plurality of managed mobile devices, at 1002. For example, in FIG. 1, the manager mobile device 110 may receive user input 102 selecting the first managed mobile device 140. In an illustrative embodiment, an icon corresponding to the first managed mobile device 140 may be selected, as described with reference to the student tablet icons in FIGS. 5-9.

The method 1000 also includes displaying, at the manager mobile device, a list of applications executable by the managed mobile device and/or a list of websites accessible by the managed mobile device, at 1004. For example, in FIG. 1, the manager app 112 may display the list of apps 122 and/or the list of websites 123. In an illustrative embodiment, the displayed list of apps and list of websites may correspond to the lists displayed in FIGS. 6-7.

Figure 6:
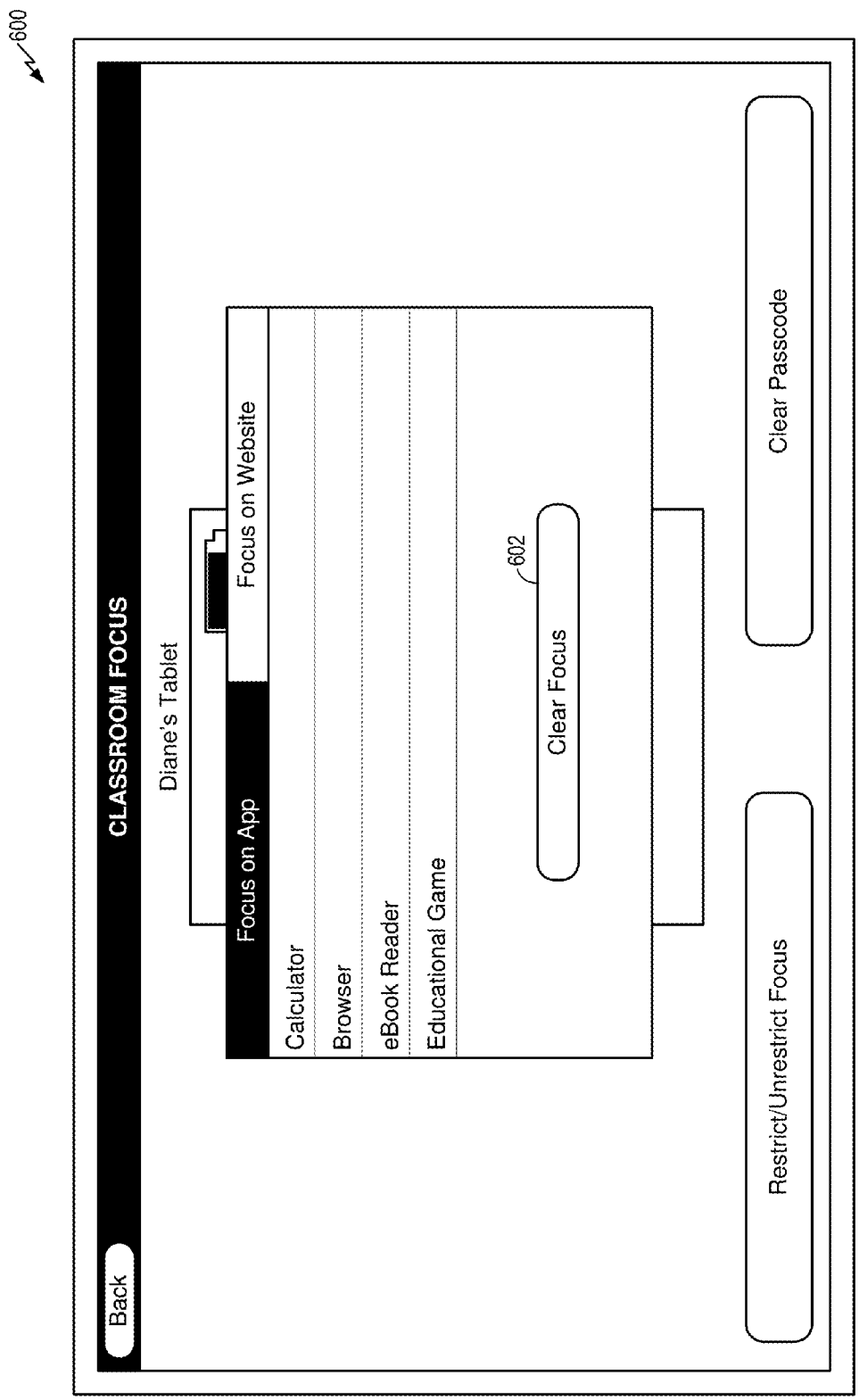
FIG. 6 illustrates a particular embodiment of an interface including a list of applications.
Figure 7:
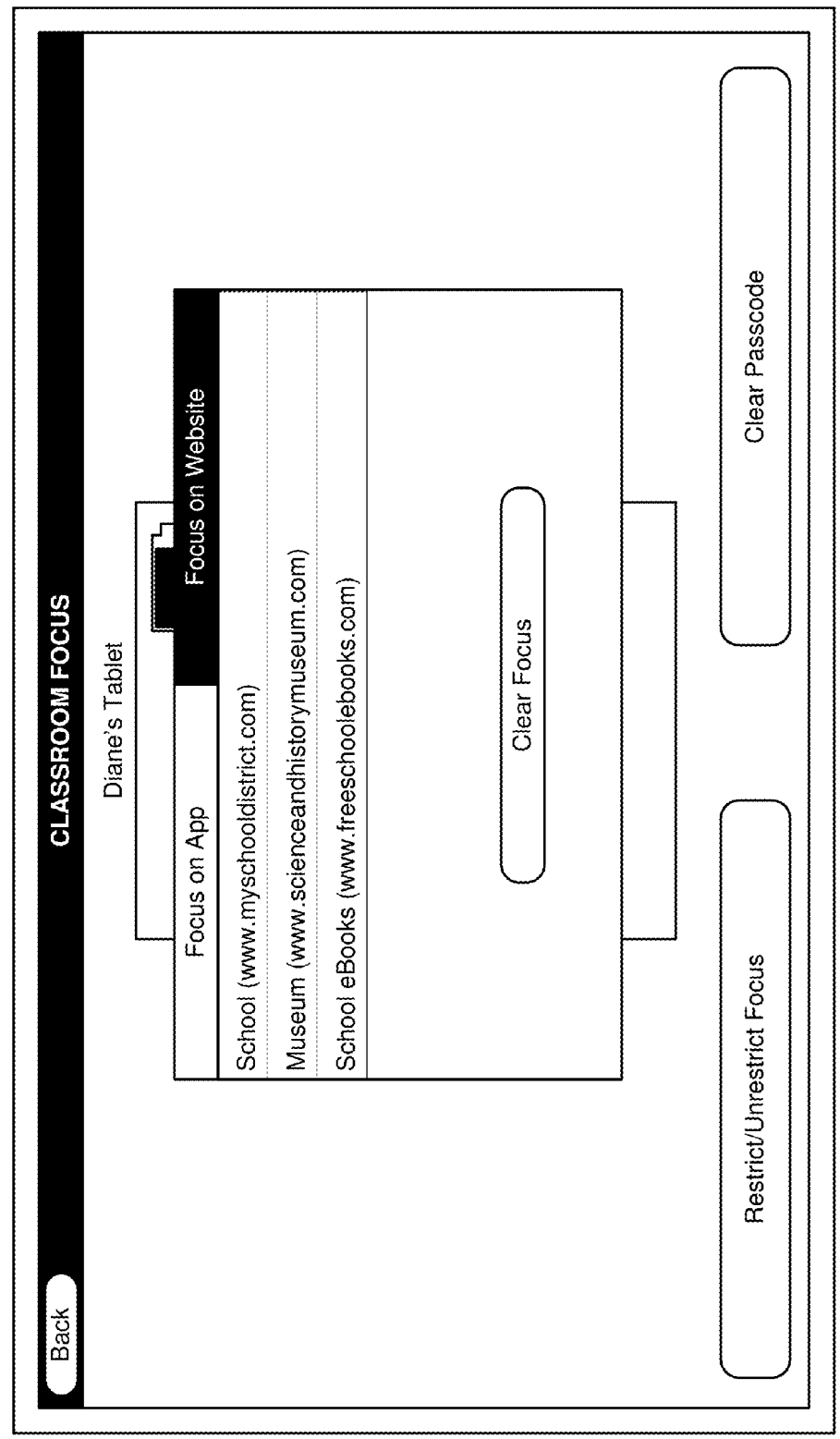
FIG. 7 illustrates a particular embodiment of an interface including a list of websites.

The method 1000 further includes receiving, at the manager mobile device, a selection of an application from the list of applications or a website from the list of websites, at 1006. For example, in FIG. 1, the calculator app 145 at the first managed mobile device 140 may be selected via the user input 102. In an illustrative embodiment, the calculator app may be selected from a list of apps as shown in FIG. 6.

The method 1000 includes initiating, at the manager mobile device, transmission of data to the managed mobile device instructing the managed mobile device to restrict focus to the selected application or the selected website, at 1008. For example, the manager app 112 may send the management message 113 to the MDM server 120, where the management message 113 identifies the first managed mobile device 140, the calculator app 145, and a "focus lock" command. In response to the management message 113, the MDM server 120 may send the notification request 124 to the push notification service 130 to cause transmission of the push notification 131 to the first managed mobile device 140. In response to the push notification 131, the first managed mobile device 140 may retrieve the command 133. Thus, in response to the user input 102 from the user 101, the manager mobile device 110 may initiate a sequence of messages between the manager mobile device 110, the MDM server 120, the push notification service 130, and/or the first managed mobile device 140. After focus at the first managed mobile device 140 is restricted to the calculator app 145 (as shown in FIG. 1 by a lock icon), the first managed mobile device 140 may provide the feedback 147 to the MDM server 120, which may provide the feedback 125 to the manager app 112. In response to the feedback 125, the manager app 112 may display an icon corresponding to the first managed mobile device 140 to indicate that the first managed mobile device 140 is locked to the calculator app 145. For example, a calculator app icon may be displayed, as illustrated for Bobby's Tablet in FIGS. 5 and 8.

Figure 11:
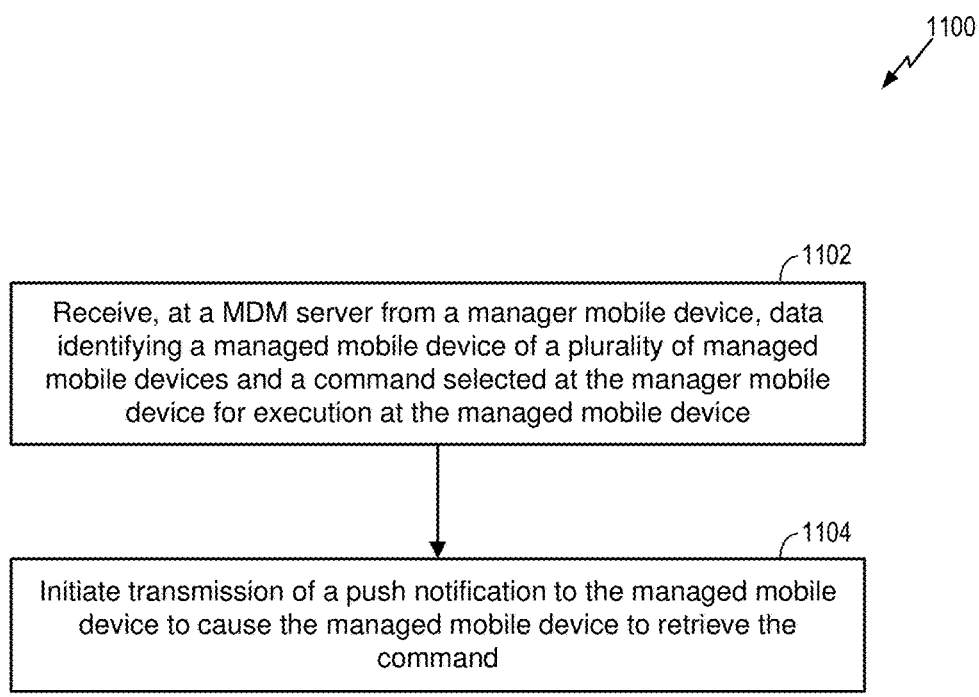
FIG. 11 is a flowchart to illustrate a particular embodiment of a method of operation at a mobile device management (MDM) server

Referring to FIG. 11, a particular embodiment of a method of operation at a MDM server is shown and generally designated 1100. In an illustrative embodiment, the method 1100 may be performed by the MDM server 120 of FIG. 1.

Figure 8:
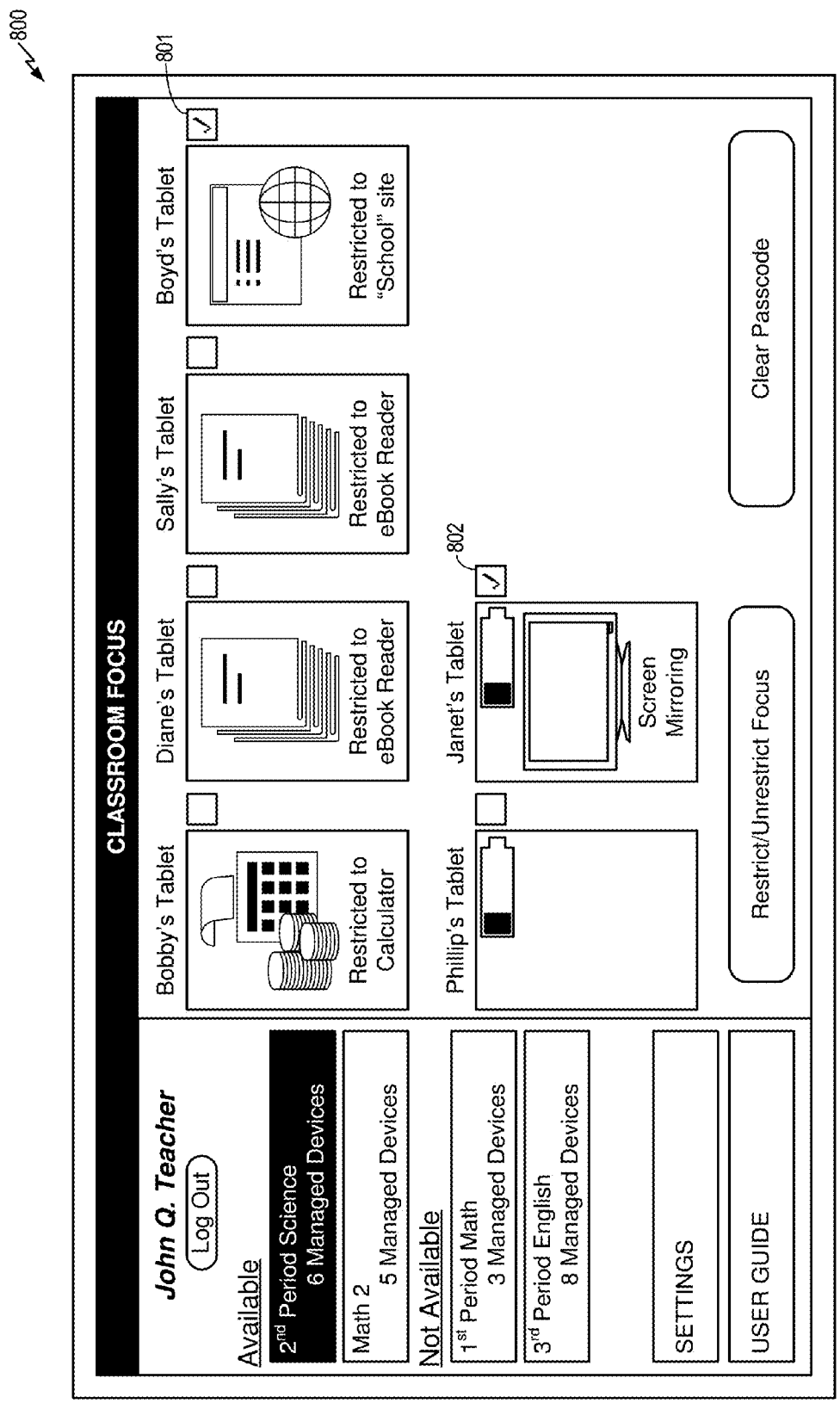
FIG. 8 illustrates a second particular embodiment of a management interface.
Figure 9:
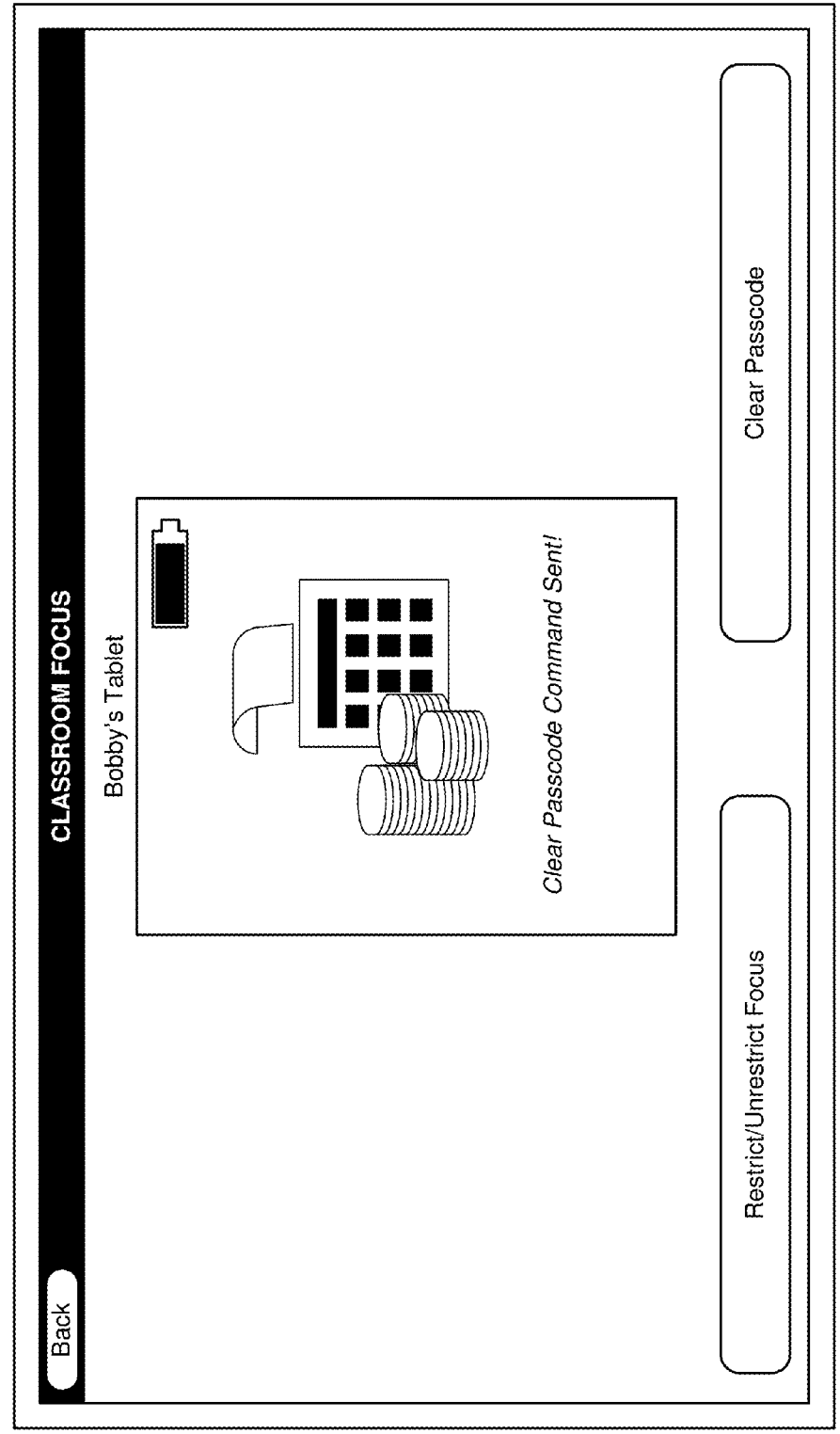
FIG. 9 illustrates a particular embodiment of a clear passcode interface.

The method 1100 includes receiving, at a MDM server from a manager mobile device, data identifying a managed mobile device of a plurality of managed mobile devices and a command selected at the manager mobile device for execution at the managed mobile device, at 1102. For example, referring to FIG. 1, the MDM server 120 may receive the management message 113, where the management message 113 identifies one of the managed mobile devices 140 or 150 and a selected command (e.g., focus restrict/lock, focus unrestrict/unlock, clear passcode, start screen mirroring, stop screen mirroring, obtain a document, etc.). In an alternate embodiment, multiple managed mobile devices may be selected, such as via checkboxes as shown in FIG. 8.

The method 1100 also includes initiating transmission of a push notification to the managed mobile device to cause the managed mobile device to retrieve the command, at 1104. For example, referring to FIG. 1, the MDM server 120 may send the notification request 124 to the push notification service 130 to cause the push notification service 130 to transmit the push notification 131 or the push notification 132. If multiple managed devices are selected, push notifications may be sent to each of the selected managed devices. In response to a push notification (e.g., the push notification 131), a managed mobile device (e.g., the first managed mobile device 140) may retrieve a command for execution (e.g., the command 133).

Figure 12:
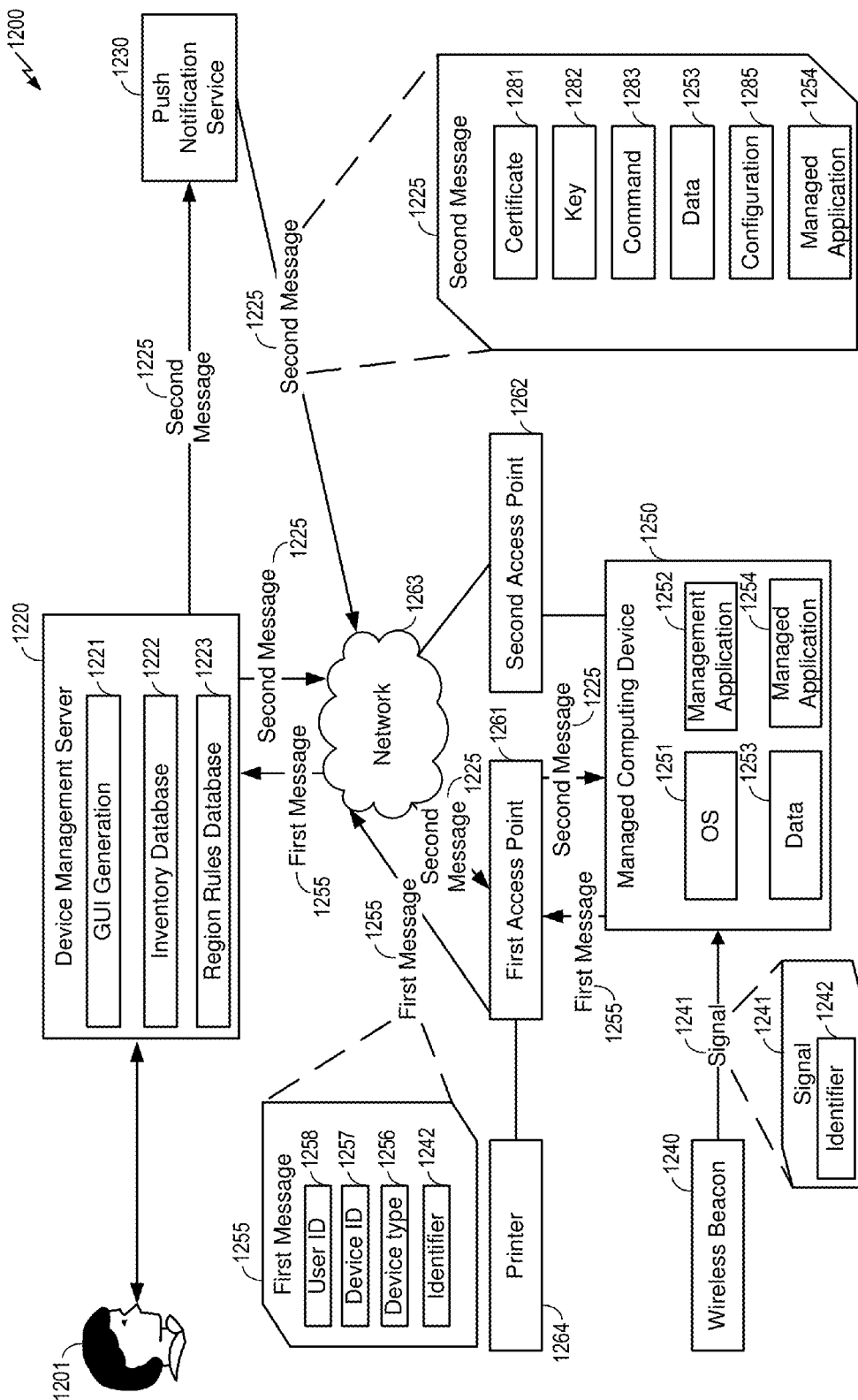
FIG. 12 is a diagram that illustrates a particular embodiment of a system that is operable to manage functionality of a managed device, based on proximity to a wireless beacon, at a first time.

Referring to FIG. 12, a particular embodiment of a system 1200 that is operable to grant a managed computing device access to functionality based on detection of a wireless beacon is shown. The system 1200 includes a device management server 1220 (e.g., a mobile device management server) that is communicably coupled to a push notification service 1230 (e.g., a push notification server) and to a network 1263. The network 1263 may be a public (e.g., the Internet) and/or private network, and, in some examples, the device management server 1220 is coupled to the notification service 1230 via the network 1263. In an illustrative embodiment, the push notification service 1230 corresponds to the push notification service 130 of FIG. 1.

The device management server 1220 may correspond to hardware and/or software that implements device management functions. For example, the device management server 1220 may be a mobile device management (MDM) server. In a particular embodiment, the device management server 1220 corresponds to the MDM server 120 of FIG. 1. In an illustrative non-limiting example, in an educational context, the device management server 1220 may manage teacher and student computers and mobile devices. It should be noted that although various embodiments are described herein with reference to educational settings, this is for example only and not to be considered limiting. The teachings of the present disclosure may be applied to other environments, including but not limited to home environments, corporate environments, retail environments, etc.

Examples of device management actions may include, but are not limited to, installing an application at a managed device, adjusting a configuration setting at a managed device, providing content to a managed device, sending a message to a managed device, setting or clearing a passcode, editing one or more inventory data attributes, sending a communication/message (e.g., an e-mail or a SMS message), deleting data, sending remote commands, granting the managed device access to particular functionality, restricting certain functionality at a managed device, etc.

The device management server 1220 may include a graphical user interface (GUI) generation module 1221, an inventory database 1222, and a region rules database 1223. The GUI generation module 1221 may be configured to generate various GUIs related to managing computing devices. The inventory database 1222 may store registration information and inventory information related to computing devices managed by the device management server 1220.

As an illustrative non-limiting example, inventory data for a managed computer may include values for one or more of the following inventory attributes:

Active Directory Status, Application Title, Application Version, Architecture Type, Asset Tag, Available RAM Slots, Available SWUs, Bar Code, Battery Capacity, Boot Drive Percentage Full, Boot ROM, Building, Bus Speed MHz, Cached Packages, Computer Group, Computer Name, Department, Disk Encryption Configuration, Drive Capacity MB, Customer Care ID, Encrypted Volumes Eligibility, Encrypted Volumes Individual Key Validation, Encrypted Volumes Institutional Key, Encrypted Volumes Partition Encryption State, Encrypted Volumes Recovery Key Type, Encrypted Volumes Status, Encrypted Volumes User, Email Address, Enrollment Method: PreStage enrollment, Font Title, Font Version, Full Name, IP Address, Last Check-in, Last Enrollment, Last Inventory Update, Lease Expiration, Licensed Software, Life Expectancy, Local User Accounts, MAC Address, Make, Mapped Printers, Master Password Set, MDM Platform Binary Version, MDM Server ID, Model, Model Identifier, NIC Speed, Number of Available Updates, Number of Processors, Operating System, Optical Drive, Packages Installed By MDM Suite, Packages Installed By Native Installer/SWU, Partition Name, Phone Number, Platform, Plug-in Title, Plug-in Version, PO Date, PO Number, Position, Processor Speed MHz, Processor Type, Purchase Price, Purchased or Leased, Purchasing Account, Purchasing Contact, Room, Running Services, S.M.A.R.T. Status, Scheduled Tasks, Serial Number, Service Pack, SMC Version, Total RAM MB, Username, Vendor, Warranty Expiration As another illustrative non-limiting example, inventory data for a managed mobile device may include values for one or more of the following inventory attributes:

Activation Lock Bypass Enabled, App Identifier, App Name, App Version, Asset Tag, Available Space MB, Battery Level, Block Encryption Capability, Bluetooth® MAC Address, Building, Capacity MB, Carrier Settings Version, Cellular Technology, Certificate Name, Current Carrier Network, Current Mobile Country Code, Current Mobile Network Code, Customer Care ID, Data Protection, Data Roaming Enabled, Department, Device ID, Device Locator Service Enabled, Device Phone Number, Display Name, Do Not Disturb Enabled, Email Address, Enrollment Method: Enrollment profile, Enrollment Method: Pre-Stage enrollment, Enrollment Method: User-initiated—invitation, Enrollment Method: User-initiated—no invitation, Expires, File Encryption Capability, Full Name, Hardware Encryption, Home Carrier Network, Home Mobile Country Code, Home Mobile Network Code, ICCID, Identifier, Identity, IMEI, IP Address, Languages, Last Backup, Last Enrollment, Last Inventory Update, Lease Expiration, Life Expectancy, Locales, MDM Profile Removal Allowed, MEID, Mobile Device Group, Model, Model Identifier, Modem Firmware Version, OS Build, OS Version, Passcode Compliance, Passcode Compliance with Profile(s), Passcode Status, PO Date, PO Number, Position, Profile Name, Provisioning Profile Name, Purchase Price, Purchased or Leased, Purchasing Account, Purchasing Contact, Roaming, Room, Serial Number, Subscriber MCC, Subscriber MNC, Supervised, UDID, Used Space Percentage, User Phone Number, Username, Vendor, Version, Voice Roaming Enabled, Warranty Expiration, Wi-Fi MAC Address, Wireless Media Streaming Password The region rules database 1223 may store rules for managing computing devices that are located in particular regions that may be defined by one or more wireless beacons, as further described herein.

The system 1200 may include managed computing devices, such as an illustrative managed computing device 1250. The managed computing device 1250 may be a portable computing device with wired and/or wireless networking capability. For example, the managed computing device 1250 may be a desktop computer, a laptop computer, etc. Alternatively, the managed computing device 1250 may be a portable device with wireless networking capability. For example, the managed computing device 1250 may be a tablet computer, a mobile phone, a portable media player, an electronic book (eBook) reader, or any combination thereof. In an illustrative embodiment, the managed computing device 1250 corresponds to the managed mobile devices 140, 150 of FIG. 1.

The managed computing device 1250 may communicate with the device management server 1220 via the network 1263, a first access point 1261, and/or a second access point 1262. In a particular example, the first access point 1261 may permit open (e.g., unauthenticated and/or unsecured) communication via the network 1263. Use of the second access point 1262 may require authentication and may provide secured (e.g., encrypted) communication via the network 1263. The access points 1261-1262 may correspond to wireless access points, such as IEEE 802.11 access points or 3G/4G base stations. In example of FIG. 12, a printer 1264 is coupled to the first access point 1261. It should be noted that the printer 1264 may be also or alternatively be coupled to the second access point 1262 and/or to the network 1263. In some embodiments, the printer 1264 includes wireless capabilities that enable the printer 1264 to receive print requests from a requesting device without communicating via one of the access points 1261, 1262 or via the network 1263. In alternative embodiments, different devices may be coupled to and accessible via an access point The managed computing device 1250 may be managed by the device management server 1220, and data regarding the managed computing device 1250 may be included in the inventory database 1222. The inventory database 1222 may store configuration settings, data, software, rules associated with the region rules database 1223, or a combination thereof, related to the managed computing device 1250. For example, the inventory database 1222 may store data indicating whether particular rules stored in the region rules database 1223 are being applied to the managed computing device 1250. Further, the inventory database 1222 may identify whether particular software or data is stored at the managed computing device 1250 or whether particular configuration settings are in place at the managed computing device 1250. To illustrate, the managed computing device 1250 may periodically provide inventory data updates to the device management server 1220. Alternatively, the computing device 1250 may report an update to the device management server 1220 in response to a triggering event (e.g., polling from the device management server 1220, installation of software, storing of data, setting of a configuration setting, etc.). It should be noted that although a single managed computing device 1250 is shown in FIG. 12, the present disclosure is not limited to any particular configuration or number of devices. In alternate embodiments, a different number of managed computing devices may be present and/or included in the inventory database 1222. The device management server 1220 may manage access to functions at the managed computing device 1250. In particular examples, the managed computing device 1250 may be associated with a particular user (not shown).

The managed computing device 1250 may include an operating system (OS) 1251. The OS 1251 may control computing functions, such as input/output (e.g., a touchscreen display, speaker, microphone, camera, etc.) and networking (e.g., cellular, Bluetooth®, IEEE 802.11, Ethernet, etc.). The OS 1251 may also support execution of applications, such as a management application 1252 and a managed application 1254, and provide such applications access to device resources and data 1253. As further described herein, the management application 1252 may communicate with the device management server 1220 to implement device management. The managed application 1254 may be an application whose operation can be initiated, terminated, and/or affected by the device management server 1220. Examples of the managed application 1254 include, but are not limited to, a web browser, e-mail, a calendar, social networking, a document/eBook reader, a media player, etc. The applications 1252, 1254 may correspond to software instructions that are stored in a memory and executed by a processor, hardware circuits that implement application functionality, or both. The applications 1252, 1254 may be pre-installed (e.g., as part of or along with an OS) or may be installed after being downloaded (e.g., via a storefront) or sideloaded (e.g., from an external storage device).

The system 1200 further includes a wireless beacon 1240. The wireless beacon 1240 may be associated with (e.g., located within or near) a particular region (e.g., a particular room, such as a classroom or a conference room, a particular building, such as a school or a hospital, a particular street, etc.). The wireless beacon 1240 may, continuously or periodically, wirelessly transmit a signal 1241 that includes an identifier 1242. The identifier 1242 may be associated with the particular region and may correspond to a region for which rules are stored in the region rules database 1223. In an illustrative embodiment, the wireless beacon 1240 transmits the signal 1241 via a personal area network connection or other short range connection, such as Bluetooth® low energy (BLE).

Although a single wireless beacon 1240 is shown in FIG. 12, the disclosure is not so limited. For example, a plurality of wireless beacons may be included in the system 1200 and the device management server 1220 may manage rules for a plurality of regions. Each region of the plurality of regions may correspond to one or more wireless beacons of the plurality of wireless beacons. Each wireless beacon (e.g., the wireless beacon 1240) may have an adjustable transmission range that may be set via user input or via input from the device management server 1220. In some examples, a region may be defined by transmission/coverage areas of multiple wireless beacons. For example, a location of the managed computing device 1250 within a particular region may be triangulated based on signal strengths of signals received from three or more wireless beacons of the region.

In operation, the device management server 1220 may receive input from a user 1201 (e.g., a system administrator) defining regional rules to be stored in the region rules database 1223. The regions may be based on transmission areas of beacons, such as the wireless beacon 1240. The regional rules may further be further based on an identity of a user associated with a device, a device type, a device identifier or a combination thereof. For example, interacting with a GUI provided by the GUI generation module 1221, the user 1201 may define a rule associated with a region associated with wireless beacon 1240. The rule may cause the device management server 1220 to perform a particular management action for a device in response to determining that the device is located in the corresponding region. In one example, the particular management action may include granting the device access to particular functionality, such as use of the printer 1264, use of the second access point 1262, use of the managed application 1254, or access to a virtual private network (VPN), access to the data 1253, or access to some other functionality.

For example, the OS 1251 may receive the signal 1241 and report the signal 1241 to the management application 1252. The management application 1252 may cause a first message 1255 to be transmitted to the device management server 1220 via the first access point 1261 (e.g., an unsecured access point) and the network 1263. The first message 1255 may include a user identifier (ID) 1258 associated with a user of the managed computing device 1250, a device ID 1257 associated with the managed computing device 1250, a device type 1256 of the managed computing device 1250, the identifier 1242, or a combination thereof. In alternative embodiments, the first message 1255 may include more, fewer, and or/different types of data.

The device management server 1220 may receive the first message 1255 and may determine, based on data included in the first message (e.g., the identifier 1242), that the managed computing device 1250 is a particular wireless beacon region associated with the wireless beacon 1240. In response, the device management server 1220 may determine whether any rules associated with the wireless beacon region are stored in the region rules database 1223. When rule(s) for the wireless beacon region are stored in the region rules database 1223 (and the rule(s) have not already been applied to the managed computing device 1250), the device management server 1220 may generate a second message 1225 based on the rule(s). For example, when the rule(s) indicate that access to particular functionality is to be granted to managed computing devices in the wireless beacon region, the second message 1225 may grant the managed computing device 1250 access to the particular functionality. The management application 1252 may receive the second message 1225 and may perform one or more actions based on the second message 1225, such as action(s) that enable access by the managed computing device 1250 to particular functionality.

As an illustrative non-limiting example, the second message 1225 may grant the managed computing device 1250 access to the printer 1264. Thus, the second message 1225 may include a certificate 1281 or a key 1282 used to authenticate the managed computing device 1250 with the printer 1264. In addition or in the alternative, the second message 1225 may include configuration settings 1285 that configure the managed computing device 1250 to use the printer 1264. In alternative embodiments, the second message 1225 granting access to the printer 1264 may include more, fewer, and/or different types of data (e.g., an IP address of the printer, a printer driver to be installed at the managed computing device 1250, a network location from which to download the print driver, etc.).

As another illustrative non-limiting example, the second message 1225 may grant access to the second access point 1262 (e.g., a secured access point). For example, the certificate 1281 may be used to authenticate the managed computing device 1250 and/or the key 1282 may be used for encrypted communication with the second access point 1262. In addition or in the alternative, the second message 1225 may include the configuration settings 1285 to configure the managed computing device 1250 to communicate using the second access point 1262. In alternative embodiments, the second message 1225 granting access to the second access point 1262 may include more, fewer, and/or different types of data.

As another illustrative non-limiting example, the second message 1225 may grant access to data 1253. For example, the second message 1225 may be the source of the data 1253 stored at the managed computing device 1250. In addition or in the alternative, the second message 1225 may include the key 1282 to enable decryption of the data 1253 at the managed computing device. In particular examples, the data may correspond to a document or to an eBook. In alternative embodiments, the second message 1225 granting access to the data 1253 may include more, fewer, and/or different types of data. For example, the second message 1225 may include a location (e.g., a web address) from which the managed computing device may download the data 1253.

As another illustrative non-limiting example, the second message 1225 may grant access to the managed application 1254 (or particular functionality thereof). For example, the second message 1225 may include an installation package or link corresponding to the managed application 1254. In addition or in the alternative, the second message 1225 may include the key 1282 to enable decryption of the managed application 1254. In particular examples, the managed application 1254 may correspond to an eBook reader, a web browser, a video game, a media player, etc. In some examples, the second message 1225 may grant the managed computing device 1250 access to a portion of the managed application 1254 or turn on/unlock a feature of the managed application 1254. For example, the second message 1225 may enable a secure test taking feature of a word processing application when the managed computing device 1250 is in a wireless beacon region corresponding to a test taking environment at a school. The secure test taking feature may enable the word processing application to download and display a test prompt and to upload an answer. As another example, the second message 1225 may turn on a subtitle function of a movie player application when the wireless beacon 1240 is associated with a library region. In alternative embodiments, the second message 1225 granting access to the managed application 1254 may include more, fewer, and/or different types of data. For example, the second message 1225 may include a location (e.g., a web address) from which the managed computing device 1250 may download the managed application 1254.

As another non-limiting example, the second message 1225 may grant access to a VPN. For example, the certificate 1281 may be used to authenticate the managed computing device 1250 and/or the key 1282 may be used to communicate with the VPN. In addition or in the alternative, the second message 1225 may include the configuration settings 1285 to configure the managed computing device 1250 to communicate using the VPN. In alternative embodiments, the second message 1225 granting access to the second access point 1262 may include more, fewer, and/or different types of data.

In particular embodiments, the device management server 1220 determines whether the one or more rules associated with the wireless beacon 1240 are already in effect at the managed computing device 1250 by performing a device lookup in the inventory database 1222. To illustrate, a rule may indicate that the managed device 1250 is to be given access to the printer 1264 when the managed computing device 1250 is in range of the wireless beacon 1240. However, the inventory database 1222 may indicate that the managed computing device 1250 already has access to the printer 1264. Accordingly, in this case, the device management server 1220 may not initiate transmission of the second message 1225. Furthermore, when the second message 1225 is transmitted to the managed computing device 1250 to apply the one or more rules (e.g., granting access to the printer 1264), or in response to receiving an acknowledgement from the managed computing device 1250, the device management server 1220 may update an entry in the inventory database 1222 associated with the managed computing device 1250 to reflect that the one or more rules have been applied to the managed computing device 1250. Thus, the inventory database 1222 may be updated to reflect a current "state" of the managed computing device 1250.

In a particular embodiment, the second message 1225 includes a command 1283 that is to be executed at the managed computing device 1250. For example, the command 1283 may include a file management command (e.g., to copy, to delete, or to move a file). In other examples, the command 1283 may correspond to a command to output an alert (e.g., a tone, a video, or a text message). As another example, the command 1283 may include instructions to encrypt the data 1253, the managed application 1254, or other information stored at the managed computing device 1250 using the key 1282.

In a particular embodiment, the device management server 1220 may also revoke access by the managed computing device 1250 to particular functionality in response to determining that the managed computing device 1250 is in a particular wireless beacon region. For example, the command 1283 or the configuration settings 1285 may revoke access to the printer 1264, the second access point 1262, the managed application 1254, the data 1253, etc. To illustrate, the managed computing device 1250 may be prevented from accessing a web browsing application or a game application in response to the first message 1255 indicating that the managed computing device 1250 has detected a wireless beacon associated with a classroom. As another example, the managed computing device 1250 may be restricted to accessing a specific educational application (e.g., a calculator) or website when the managed computing device 1250 is in the classroom. That is, "focus" of the managed computing device 1250 may be restricted to the particular application or website.

It should be noted that while the second message 1225 is shown as including a single certificate 1281, a single key 1282, a single command 1283, a single instance of data 1253, a single configuration setting 1285, and a single managed application 1254, more or fewer of each of these elements may be included in the second message 1225. For example, the second message 1225 may include two certificates 1281. A first certificate may be used by the managed device 1250 to authenticate with a VPN and a second certificate may be used to authenticate with the second access point 1262. Moreover, it should be noted that the various management actions described herein are for examples and not to be considered limiting. Additional management actions may also be performed based on proximity of a managed computing device to a wireless beacon device, such as management actions corresponding to changes in one or more of inventory data attributes (e.g., enabling/disabling hard disk encryption, data roaming, etc.). Moreover, in particular embodiments, a set of available management actions for managed computers may differ from a set of available management actions for managed mobile devices.

In some examples, the device management server 1220 may add the managed computing device 1250 to a "smart" group based on the first message 1255. As used herein, a "smart" group may be a group of managed computing devices, where membership in the group is dynamically determined by the managed computing device 1250. For example, the user 1201 may define a smart group based on grouping criteria that includes a criterion that is satisfied when a managed computing device is in the region of the wireless beacon 1240. To illustrate, the wireless beacon 1240 may be inside a math class and the smart group may be "Math class devices with low battery," corresponding to the grouping criteria (Region=MathClass AND BatteryLevel<20%). The user 1201 may also provide input indicating that a particular device management action is to be performed for devices in the smart group (e.g., sending a reminder "Don't forget to charge your device using the outlets at the back wall of the math classroom"). In response to the first message 1255, the device management server 1220 may determine that the managed computing device 1250 is in the math class. When the inventory database 1222 indicates that the managed computing device 1250 has a battery level less than 20%, the device management server 1220 may initiate sending the reminder to the managed computing device 1250 (e.g., by sending the second message 1225).

In some examples, the device management server 1220 may generate reports associated with wireless beacons, such as the wireless beacon 1240. For example, each report may include information regarding devices in range of the associated wireless beacon. In such embodiments, the user ID 1258, the device ID 1257, the device type 1256, the identifier 1242, or a combination thereof may be included in the report. Further, the command 1283 may include instructions that cause the managed computing device 1250 to transmit additional information to the device management server 1220 to be included in the report. For example, additional information may include inventory information, such as whether a particular application is installed at the managed computing device 1250, or may include data, such as the data 1253.

Thus, the device management system 1200 may enable the device management server 1220 to manage access by the managed computing device 1250 to particular functionality based on proximity managed computing device 1250 to the wireless beacon 1240. Managing a computing device based on proximity to a wireless beacon may enable the computing device to be managed based on location with reduced power consumption and increased privacy as compared to GPS-based methods. For example, unlike in GPS-based methods, an accurate location of the managed computing device 1250 may not be communicated to the device management server 1220 when the managed computing device 1250 is outside the school. Further, detecting the signal 1241 (e.g., via BLE) may consume less power than operating a GPS receiver at the managed computing device 1250.

Figure 13:
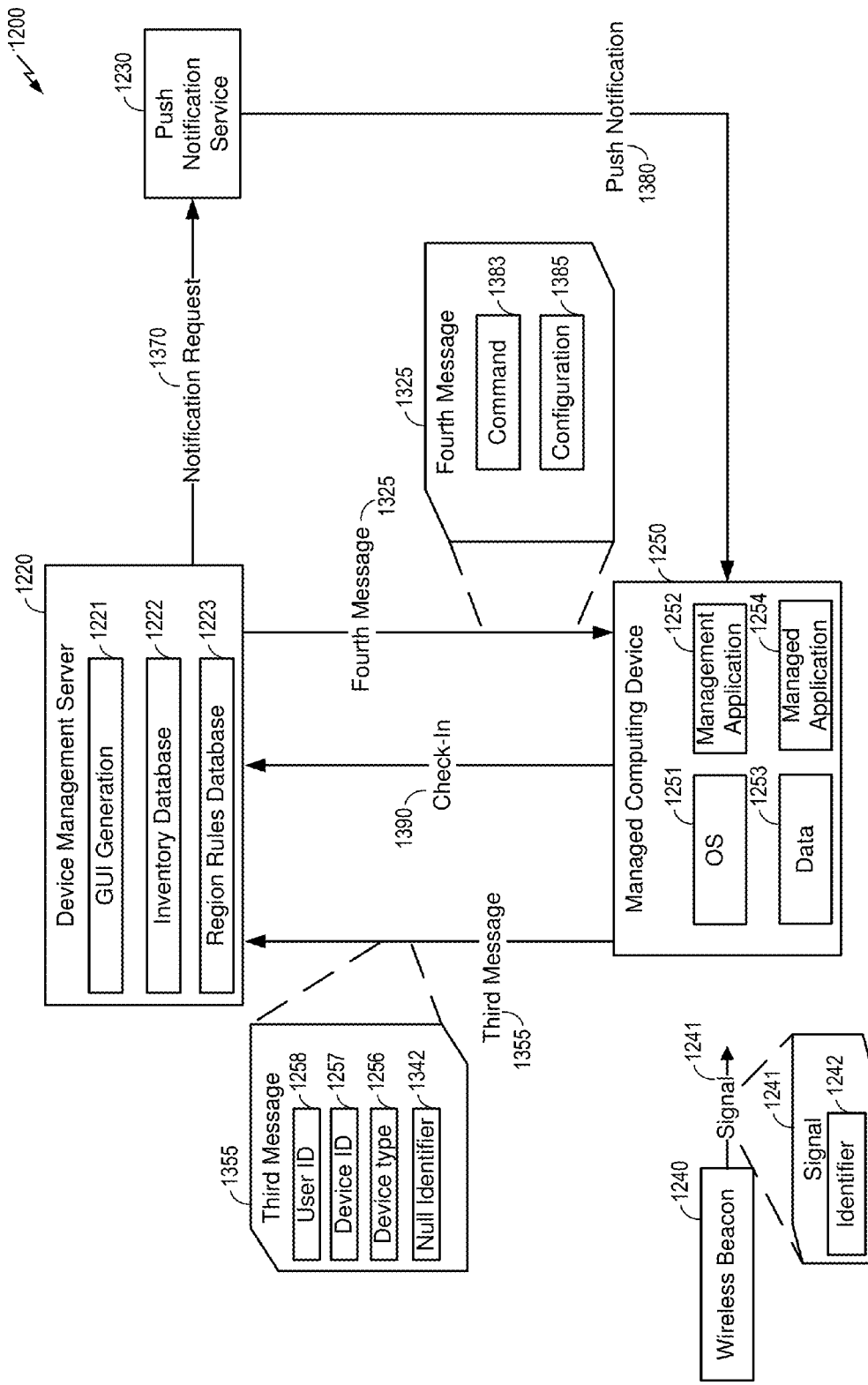
FIG. 13 is a diagram that illustrates the system of FIG. 1 at a second time.

The example of FIG. 12 illustrates the system 1200 at a first time, during which the managed computing device 1250 is within range of the wireless beacon 1240. FIG. 13 illustrates the system 1200 at a second time, during which the managed computing device is not within range of the wireless beacon 1240 (e.g., when the managed computing device 1250 no longer detects the signal 1241).

In FIG. 13, the OS 1251 may report to the management application 1252 that the managed computing device 1250 has exited a transmission range of the wireless beacon 1240. Certain components shown in FIG. 12, such as the network 1263, the access points 1261-1262, and the printer 1264 are not shown in FIG. 13 for ease of illustration. The OS 1251 may report the exit in response to detecting that the signal 1241 is absent (e.g., no longer being received). As another example, the managed computing device 1250 may be determined to have exited the transmission range of the wireless beacon 1240 when a detected signal strength of the signal 1241 is below a threshold and/or when a second detected signal strength of a second signal associated with a second wireless beacon is stronger than the signal strength of the signal 1241. The threshold may correspond to an ability to interpret the signal to identify the identifier 1242. For example, the exit may be reported in response to the signal strength of the signal 1241 being too weak for the managed computing device 1250 to correctly decode the signal to obtain the identifier 1242.

In response to the OS 1251 indicating that the managed computing device 1250 has exited the transmission range of the wireless beacon 1240, the management application 1252 may initiate transmission of a third message 1355 to the device management server 1220. The third message may be transmitted via the first access point 1261, the second access point 1262, and/or the network 1263.

The third message 1355 may include the user ID 1258, the device ID 1257, the device type 1256, and a null identifier 1342. The null identifier 1342 may indicate that no wireless beacon is in range of the managed computing device 1250. Alternatively, the null identifier 1342 may indicate which wireless beacon (e.g., the wireless beacon 1240) was previously in range of the managed computing device 1250. In some examples, if another wireless beacon is detected by the managed computing device 1250, the third message 1355 may include an identifier of the other wireless beacon. Thus, in a particular embodiment, a message sent from the managed computing device 1250 to the device management server 1220 may include a list of detected wireless beacon identifiers and corresponding signal strengths.

Based on the third message 1355, the device management server 1220 may generate a fourth message 1325. For example, the device management server 1220 may compare the null identifier 1342 with an entry in the inventory database 1222 to determine which rules from the region rules database 1223 were applied to the managed computing device 1250 in response to the first message 1255. The fourth message 1325 may include a command 1383 and/or configuration settings 1385 that revoke the application of the rules to the computing device 1250. For example, the command 1383 and or the configuration settings 1385 may revoke access to the printer 1264, to the second access point 1262, to the managed application 1254, to the management application 1252, to a VPN, etc. For example, the command 1383 may cause the managed computing device 1250 to delete or encrypt the certificate 1281, the key 1282, the command 1283, the data 1253, the configuration settings 1285, the managed application 1254, or other data received a part of the second message 1225. In addition or in the alternative, the configuration settings 1385 may configure the mobile computing device 1250 to use a different (or no) printer, a different (or no) access point, a different (or no) application, different (or no) data, a different (or no) VPN, or a combination thereof.

In a particular embodiment, to communicate a message (e.g., the second message 1225 and/or the fourth message 1325) to the managed computing device 1250, the device management server 1220 sends the message to a push notification service 1230 along with data indicating that the managed computing device 1250 is an intended recipient of the message (e.g., as illustrated in FIG. 12). The push notification service 1230 may forward the message to the managed computing device 1250 using a push notification system. In an alternative embodiment, as illustrated in FIG. 13, the device management server 1220 may initiate transmission of a message to the managed computing device 1250 by sending a notification request 1370 to the push notification service 1230, where the notification request 1370 identifies the managed computing device 1250. In response to the notification request 1370, the push notification service 1230 may send a push notification 1380 to the managed computing device 1250. The push notification 1380 may represent an instruction to the managed computing device 1250 that causes the managed computing device 1250 to check-in with the device management server 1220 (e.g., send a check-in message 1390 to the device management server 1220). The device management server 1220 may send the message (e.g., the second message 1225, the fourth message 1355, and/or and any other queued messages or actions for the managed computing device 1250) to the managed computing device 1250 in response to receiving the check-in message 1390.

Thus, the fourth message 1325 may be used to "undo" configuration settings or policies that were applied to the managed computing device 1250 in response to the managed computing device 1250 being in the region of the wireless beacon 1240. To illustrate, the fourth message 1325 may be sent when a student leaves school, so that school-specific configuration settings or policies are not enforced while the student is at home.

Referring to FIG. 14, an example of a GUI 1400 that may be generated by a device management server is shown. The GUI 1400 may be generated, for example, by the GUI generation module 1221 of the device management server 1220. The GUI 1400 includes a window 1402 including a plurality of entries 1404. Each of the entries 1404 may correspond to a region (e.g., a wireless beacon region). The entries 1404 may correspond to entries in a region rules database, such as the region rules database 1223. Each of the entries 1404 may have an associated identifier. For example, a conference room entry has an associated identifier 1406. One of the identifiers may correspond to the identifier 1242.

Each identifier may include sub-identifiers. In the illustrated example, the identifiers include a universal unique identifier (UUID), a major value, and a minor value. In a particular embodiment, the UUID may correspond to a region while the major value corresponds to sub-regions within the region and the minor value corresponds to sub-sub-regions within a sub-region. In the example of FIG. 14, a conference room entry, a classroom entry, and a library entry each have a UUID 2345, which may be associated with a school. Certain rules in a rule database, such as the rules database 1223, may be associated with the UUID 2345 (e.g., associated with the school). For example, a device management server, (e.g., the device management server 1220) may prevent managed computing devices (e.g., the managed computing device 1250) from accessing a managed multimedia application (e.g., the managed application 1254), such as a video player, and/or may provide textbook data to the managed computing devices while the managed computing devices are located in any part of the school.

The major values may be associated with sub-regions within a region. For example, the library entry and the cafeteria entry may share a major value of 3. The major value 3 may be associated with common areas or sub-regions in particular building, floor, hallway, etc. of the school. Certain rules in the rules database 1223 may be associated with major values. For example, managed computing devices (e.g., the managed computing device 1250) in sub-regions associated with the major value 3 may be allowed to access managed application (e.g., the managed application 1254), such as a web browser. Managed computing devices in sub-regions of the school associated with other major values (e.g., 8 or 4) may be prevented from accessing the managed application.

The minor values may be associated with sub-sub-regions within a sub-region. For example, the cafeteria entry may have a minor value of 1 that differs from a minor value 0 associated with the library entry. Each sub-sub-region may have different associated rules in a region rules database (e.g., the region rules database 1223). For example, audio output may be muted for managed computing devices (e.g., the managed computing device 1250) that detect a signal (e.g., the signal 1241) with an identifier (e.g., the identifier 1242) associated with the library entry (e.g., having a UUID value=2345, a major value=3, and a minor value=0).

Figure 15:
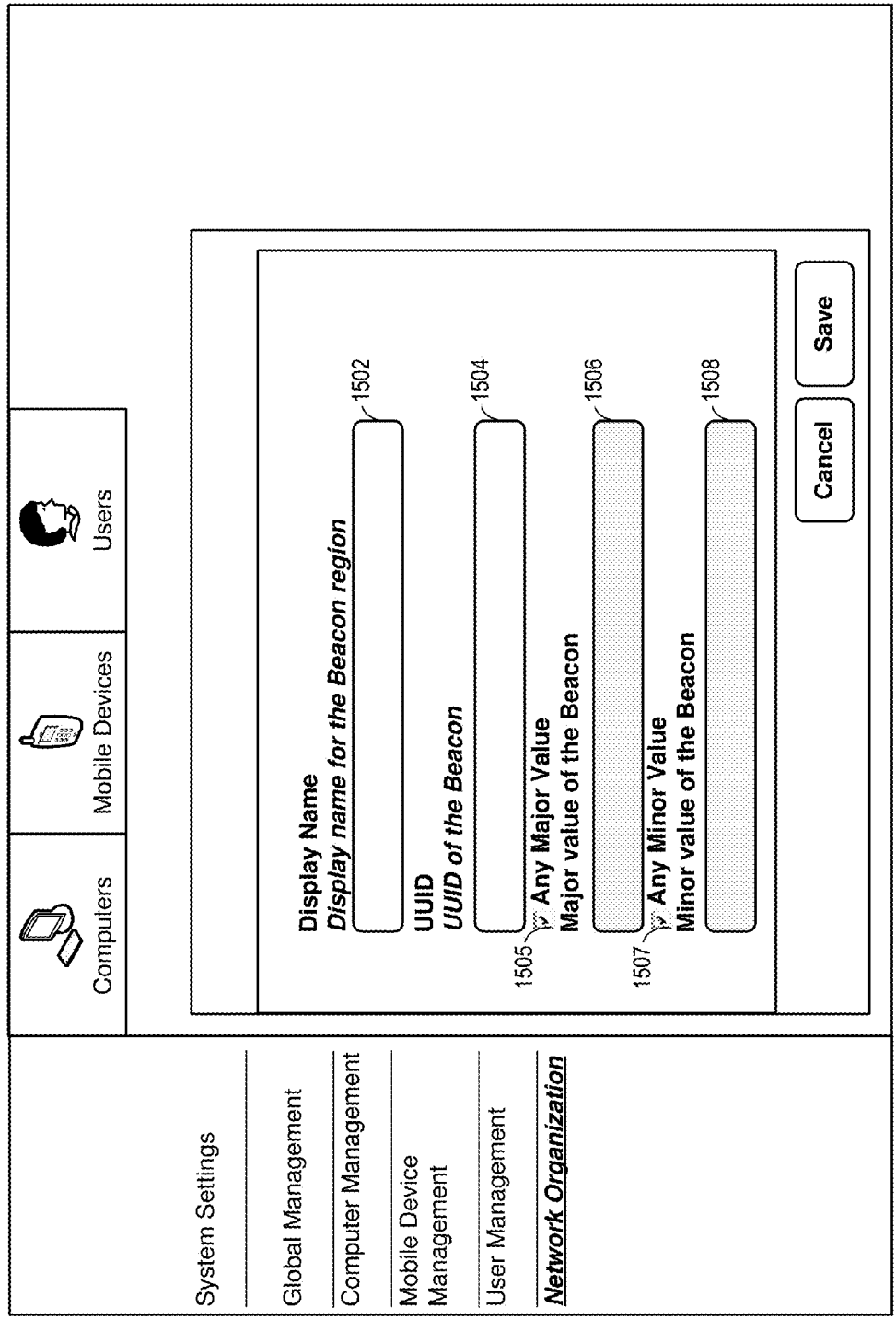
FIG. 15 illustrates another particular example of a GUI associated with managing functionality of a managed device based on proximity to a wireless beacon.

The GUI 1400 may further include an "add" button 1408. In response to a selection of the "add" button 1408, a device management server (e.g., the device management server 1220) may display another GUI configured to receive input from a user (e.g., the user 1201) to identify a new region to be added to a region rules database (e.g., the region rules database 1223). Although not shown in FIG. 14, in alternative embodiments the GUI 1400 may also include buttons operable to edit, delete, and/or clone a region. Referring to FIG. 15, an example of a GUI 1500 that may be generated in response selection of the "add" button 1408 is shown. A device management server may receive user input via the GUI 1500 that includes information used to add an entry to the entries 1404. The GUI 1500 includes a display name field 1502. The display name field 1502 may receive a display name (e.g., conference room, classroom, library, etc.) to be associated with the wireless beacon region being defined. The GUI 1500 further includes a UUID field 1504. The UUID field 1504 may receive input indicating a UUID of the region.

The GUI 1500 further includes any major value checkbox 1505. Selection of the checkbox 1505 may indicate that the region corresponds to wireless beacons having identifiers the UUID input into the UUID field 1504, regardless of major value. Similarly, selection of any minor value checkbox 1507 may indicate that the region corresponds to wireless beacons having identifiers the UUID input into the UUID field 1504, regardless of minor value. If specific major or minor value(s) are to be associated with the region, a major value field 1506 or a minor value field 1508 may be used to input the major or minor value(s).

Referring to FIG. 16, an example of a GUI 1600 that may be generated by a device management server is shown. The GUI 1600 may be generated, for example, by the GUI generation module 1221 of the device management server 1220. The GUI 1600 may be configured to receive input defining region rules to be stored in a region rules database (e.g., the region rules database 1223). In the example of FIG. 16, the GUI 1600 includes a "computers" tab 1604 to define region rules for managed computers and a "mobile devices" tab 1606 to define region rules for managed mobile devices. The GUI 1600 also includes a "users" tab 1610 to define region rules for managed users. For example, a region rule for a managed user may result in granting access or restricting access to particular functionality at some or all managed computing devices associated with the managed user. In alternative embodiments, the GUI 1600 may also operable to define region rules for all managed entities and/or for specific managed entities based on device ID (e.g., the device ID 1257) or user ID (e.g., the user ID 1258). The user ID 1258 may identify an individual (e.g., "Sally") and/or a set of individuals (e.g., "student").

In the GUI 1600, an "add" button 1620 is displayed for each of the wireless beacon regions. Selection of the "add" button 1620 for a particular region may cause display of GUI operable to add a region rule for the particular region.

Figure 17:
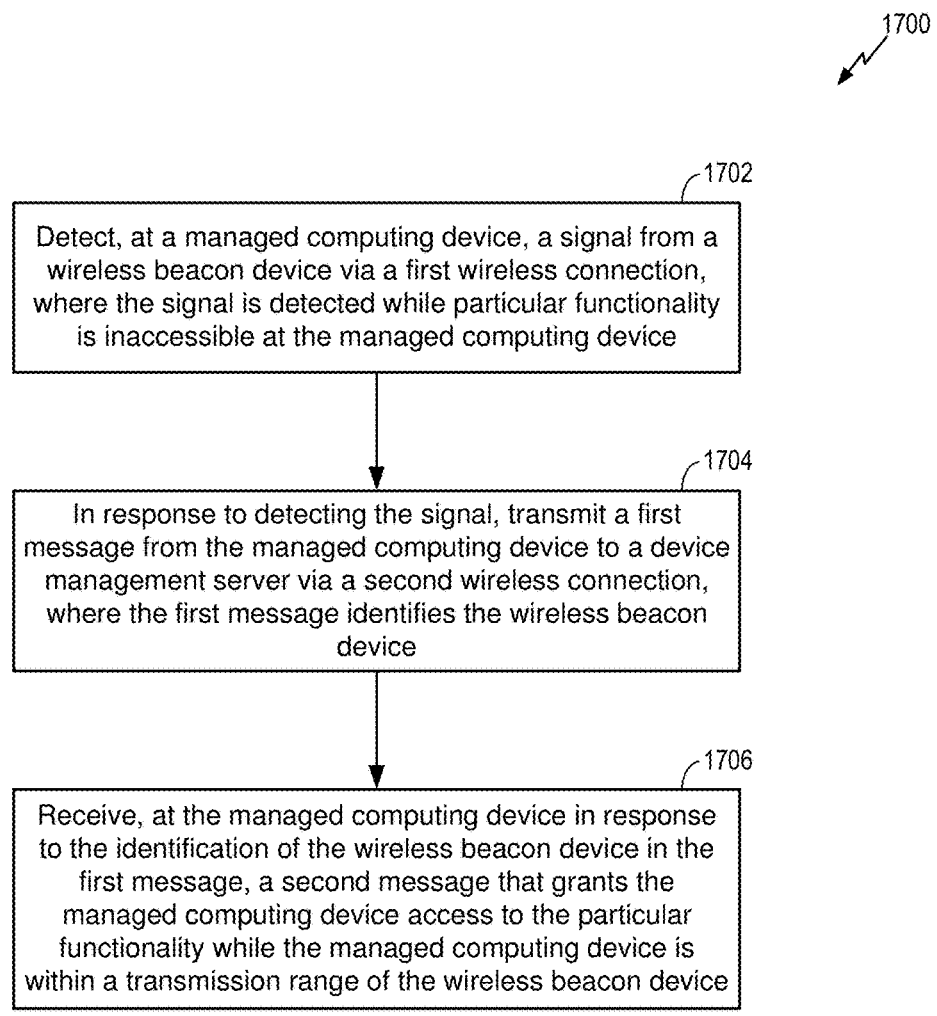
FIG. 17 illustrates a particular embodiment of a method of managing functionality of a managed device based on proximity to a wireless beacon.

Referring to FIG. 17, a flowchart illustrating a method 1700 of managing functionality based on proximity to a wireless beacon is shown. In an illustrative embodiment, the method 1700 may be performed by a managed computing device, such as the managed computing device 1250. The method 1700 includes detecting, at a managed computing device, a signal from a wireless beacon device via a first wireless connection, at 1702. The signal may be detected while particular functionality is inaccessible at the managed computing device. For example, in FIG. 12, the managed computing device 1250 may detect the signal 1241 from the wireless beacon 1240 while the managed computing device 1250 does not have access to the printer 1264.

The method 1700 further includes, in response to detecting the signal, transmitting a first message from the managed computing device to a device management server via a second wireless connection, at 1704. The first message may identify the wireless beacon device. For example, the managed computing device 1250 may transmit the first message 1255 to the device management server 1220 in response to detecting the signal 1241. The first message 1255 may include the identifier 1242 identifying the wireless beacon 1240.

The method 1700 further includes receiving, at the managed computing device in response to the identification of the wireless beacon device in the first message, a second message that grants the managed computing device access to the particular functionality while the managed computing device is within a transmission range of the wireless beacon device, at 1706. For example, the managed computing device 1250 may receive the second message 1225 from the device management server 1220 in response to the first message 1255. The second message 1225 may grant the managed computing device 1250 access to the printer 1264. When the managed computing device 1250 detects that the managed computing device 1250 has exited the transmission range of wireless beacon 1240, the managed computing device 1250 may send the third message 1355 to the device management server 1220 and may receive the fourth message 1325 that revokes access by the managed computing device 1250 to the printer 1264.

Figure 18:
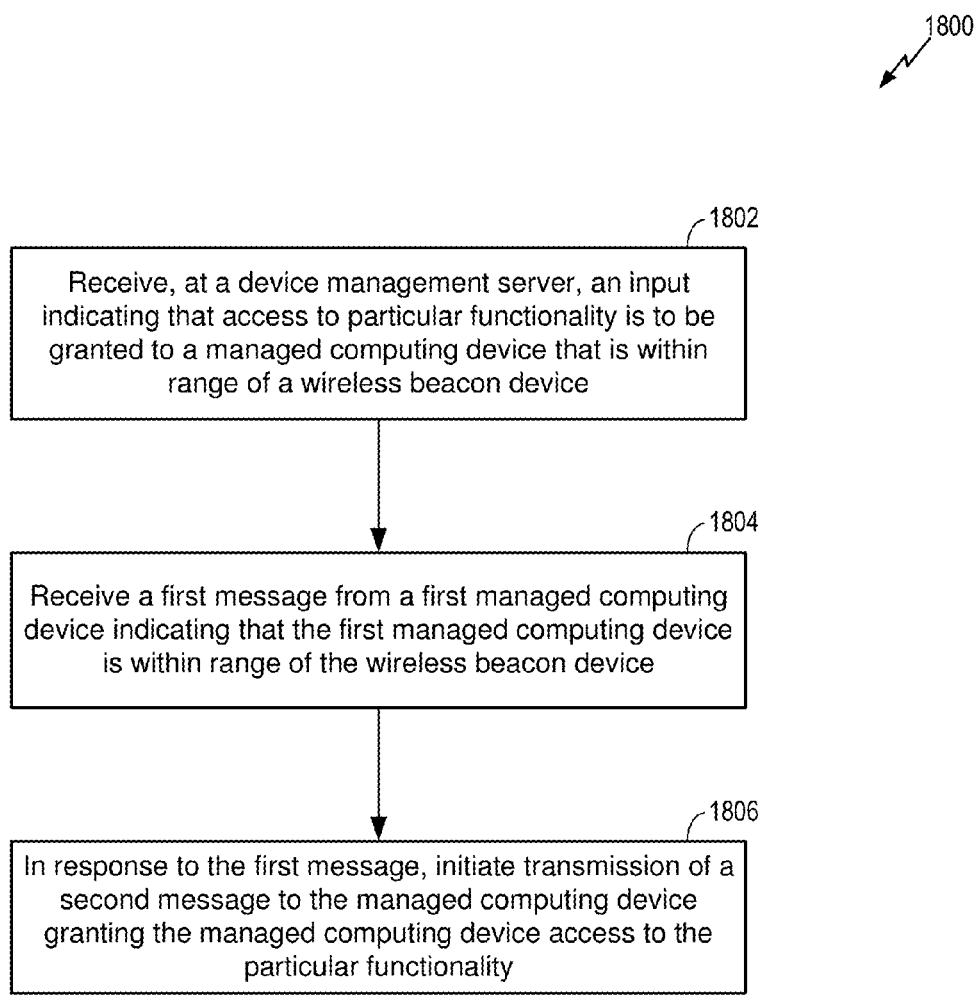
FIG. 18 illustrates another particular embodiment of a method of managing functionality of a managed device based on proximity to a wireless beacon.

Referring to FIG. 18, a method 1800 of managing functionality of a managed device based on proximity of the managed device to a wireless beacon is shown. In an illustrative embodiment, the method 1800 may be performed by the device management server 1220. The method 1800 includes receiving, at a device management server, an input indicating that access to particular functionality is to be granted to a managed computing device that is within range of a wireless beacon device, at 1802. For example, in FIG. 12, the device management server 1220 may receive input from the user 1201 defining a rule to be stored in the region rules database 1223. The rule may indicate that managed computing devices are to have access to the printer 1264 while the managed computing devices are in a particular wireless beacon region (e.g., corresponding to a transmission range of the wireless beacon 1240).

The method 1800 further includes receiving a first message from a first managed computing device indicating that the first managed computing device is within range of the wireless beacon, at 1804. For example, the device management server 1220 may receive the first message 1255. The first message 1255 may include the device ID 1257 identifying the managed computing device 1250 and the identifier 1242 associated with the wireless beacon 1240.

The method 1800 further includes, in response to the first message, initiating transmission of a second message to the first managed computing device granting the first managed computing device access to the particular functionality, at 1806. For example, the device management server 1220 may send the second message 1225 to the managed computing device 1250 in response to the first message 1255. The second message 1225 may enable the managed computing device 1250 to access the printer 1264. For example, the second message 1225 may include the configuration settings 1285 that configure the managed computing device 1250 to use the printer 1264, the certificate 1281 that authenticates the managed computing device 1250 with the printer 1264, or other data that enables the managed computing device 1250 to use the printer 1264. In an illustrative embodiment, the second message 1225 may be sent via the push notification service 1230.

Although certain embodiments may be described separately herein, it should be understood that aspects of one or more embodiments may be removed, replaced, and/or combined with aspects of other embodiments without departing from the scope of the present disclosure. Thus, according to particular aspects, one or more components illustrated and described with reference to FIG. 12 may be additionally configured to operate as described with reference to corresponding components in FIG. 1, and vice versa. To illustrate, the device management server 1220 may alternatively or additionally operate as described with reference to the MDM server 120, the push notification service 1230 may alternatively or additionally operate as described with reference to the push notification service 130, the managed computing device 1250 may alternatively or additionally operate as described with reference to one or more of the mobile devices 110, 140, 150, etc.

Figure 19:
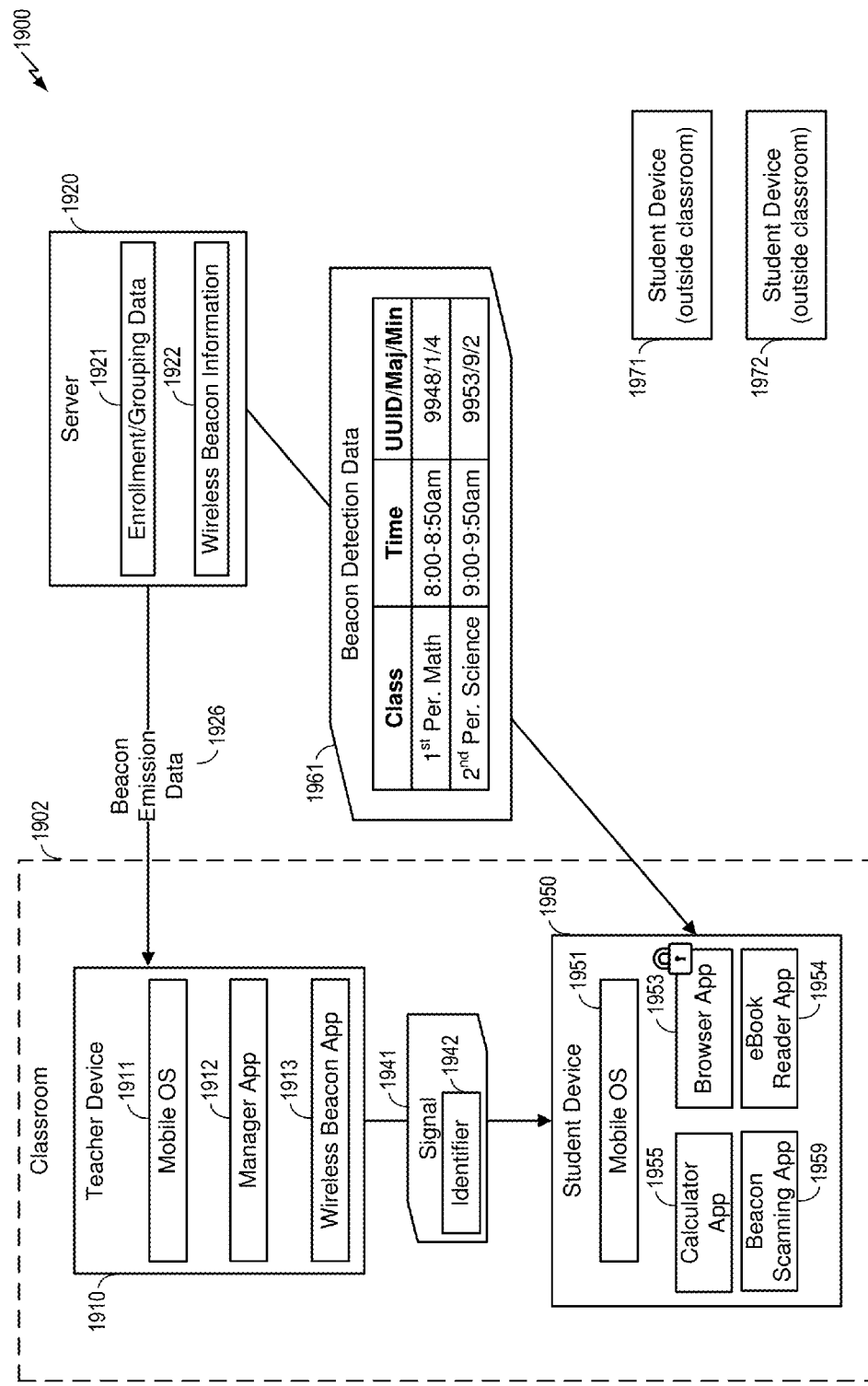
FIG. 19 illustrates a particular embodiment of a system that includes a manager device configured to control operation of a managed device, where the manager device is further configured to emit a wireless beacon signal.

FIG. 19 illustrates a particular embodiment of a system 1900 that supports determining whether a managed device is present in a particular area based on a wireless beacon signal emitted by a manager device. In the example of FIG. 19, a teacher device 1910 and a student device 1950 are located within a classroom 1902.

The teacher device 1910 may include a mobile operating system (OS) 1911 and a manager app 1912. In an illustrative embodiment, the mobile OS 1911 and the manager app 1912 operate as described with reference to the mobile OS 111 and the manager app 112 of FIG. 1. For example, as described with reference to FIG. 1, the manager app 1912 may enable a teacher to restrict the student device 1950 to accessing a particular app, website, eBook, etc.

The wireless beacon app 1911, when executed at the teacher device 1910, may cause the teacher device 1910 to perform one or more wireless beacon operations. In an illustrative embodiment, the wireless beacon app 1911 may enable the teacher device 1910 to operate as described with reference to the wireless beacon 1240 of FIG. 12. For example, the wireless beacon app 1911 may cause the teacher device 1910 to continuously or periodically emit a signal 1941 that includes an identifier 1942.

The student device 1950 may include a mobile OS 1951, a browser app 1953, an eBook reader app 1954, and a calculator app 1955. In an illustrative embodiment, the mobile OS 1951 operates as described with reference to the mobile OS 151 of FIG. 1, the browser app 1953 operates as described with reference to the browser app 153 of FIG. 1, the eBook reader app 1954 operates as described with reference to the eBook reader app 154 of FIG. 1, and the calculator app 1955 operates as described with reference to the calculator app 155 of FIG. 1.

The student device 1950 may also include a beacon scanning app 1959. The beacon scanning app 1959, when executed at the student device 1950, may cause the student device 1950 to scan particular wireless frequencies for wireless beacon signals, such as the signal 1941 from the teacher device 1910. In a particular embodiment, the beacon scanning app 1959 is automatically pushed and installed to student devices, as described with reference to FIG. 1.

As shown in FIG. 19, the teacher device 1910 and the student device 1950 may communicate with a server 1920. In an illustrative embodiment, the server 1920 corresponds to the MDM server 120 of FIG. 1 or to the device management server 1220 of FIG. 12. The server 1920 may store enrollment and grouping data 1921. For example, the enrollment and grouping data 1921 may identify devices, including the student device 1950, that are managed by the server 1920. The enrollment and grouping data 1921 may also include data that classifies managed devices into groups or subgroups, so that the managed mobile devices can be managed individually or as part of a larger group or subgroup. In an educational context, the enrollment and grouping data 1921 may include a list of all student devices, lists of student devices corresponding to a particular class (e.g., all student devices of a particular school or school district), lists of student devices in subgroups (e.g., lab partner groups or homework/project groups) within a particular class, etc.

The server 1920 may also store wireless beacon information 1922. The wireless beacon information 1922 may include information identifying when (e.g., which class time periods) and where (e.g., in which classrooms) each teacher devices is to function as a wireless beacon. The wireless beacon information 1922 may also indicate which wireless beacon signal ID each teacher device is to transmit while functioning as a wireless beacon. In one example, wireless beacon signal IDs are unique to teacher devices, and a teacher device transmits the same wireless beacon signal ID each time the teacher device functions as a wireless beacon, regardless of class time period and classroom. In another example, wireless beacon signal IDs are unique to classrooms, and student devices search for the same wireless beacon signal ID in a particular classroom, regardless of teacher device and class time period. In yet another example, wireless beacon signal IDs vary based on a combination of teacher device, class time period, and/or classroom.

During operation, when a teacher enters the classroom 1902 and starts a class using the manager app 1912 (e.g., selects "Yes" on the interface of FIG. 4, which indicates that 2nd period science class is starting), the teacher device 1910 may transmit a message to the server 1920. In response to the message, the server 1920 may access the wireless beacon information 1922. The wireless beacon information 1922 may indicate that during the 2nd period science class, the teacher device 1910 is to operate as a wireless beacon that is assigned a particular UUID, major value, and minor value. The server 1920 may send (e.g., directly or via a push notification service, such as the push notification service 130 of FIG. 1) the UUID, the major value, and the minor value to the teacher device 1910 as beacon emission data 1926, as shown. Alternatively, the teacher device 1910 may have previously received and cached the beacon emission data 1926 (e.g., during the 2nd period science class on a previous school day). The wireless beacon app 1913 may perform one or more operations to provision the teacher device 1910 as a wireless beacon, and the teacher device 1910 may begin transmitting (e.g., broadcasting) the signal 1941. The identifier 1942 in the signal 1941 may include or may be based on the UUID, the major value, and/or the minor value assigned to the teacher device 1910.

When the student device 1950 enrolls in classes, the server 1920 may send, directly or via a push notification service, beacon detection data 1961 to the student device. In a particular embodiment, as shown in FIG. 19, the beacon detection data 1961 includes UUIDs, major values, and/or minor values that the student device 1950 is to scan for during different classes. When the student device 1950 enters the classroom 1902, the student device 1950 may begin scanning wireless frequencies for the signal 1941 including the identifier 1942. When the student device 1950 detects the signal 1941 including the identifier 1942, the student device 1950 may send the server 1920, the teacher device 1910, or both a message indicating that the student device 1950 is present in the classroom 1902. The system 1900 of FIG. 19 may thus enable automatically determining student classroom attendance based on a wireless beacon signal emitted by a teacher's device. In an illustrative embodiment, such data may be used for device management purposes, as further described herein.

If a student device is present in the classroom 1902, the student device may be bound by commands issued by the teacher device 1910, such as commands to restrict focus to a particular app, website, or eBook, commands to initiate screen mirroring, etc. Conversely, if a student device is not present in the classroom 1902 (e.g., the student is home sick), the student device may be automatically excluded by the server 1920 from app restrictions, website restrictions, eBook restrictions, screen mirroring actions, other group actions, etc. Thus, in the example of FIG. 19, student devices 1971 and 1972, which are outside of the classroom 1902, may be excluded from restrictions made by the teacher device 1910 during 2nd period science class.

In a particular embodiment, after student devices have detected the signal 1941 and confirmed their presence in the classroom 1902, the server 1920 may provide the teacher device 1910 a list of the student devices that are present in the classroom. GUIs presented by the teacher device 1910 (e.g., one or more of the GUIs of FIGS. 5-9) may include the student devices that are present and may exclude student devices that are absent from the classroom 1902. When the 2nd period science class ends, the teacher device 1910 may cease transmitting the signal 1941. The teacher device 1910 may transmit a different signal 1941 with a different identifier 1942 during the next class, which may or may not take place in the classroom 1902. Similarly, the student device 1950 may search for a different wireless beacon signal during the next class, which may or may not take place in the classroom 1902.

The system 1900 of FIG. 19 thus enables a manager device (e.g., the teacher device 1910) to control a managed device (e.g., the student device 1950) based on the managed device being present in a particular area (e.g., the classroom 1902 within which the teacher device 1910 is transmitting the wireless beacon signal 1941). Managed devices that are outside of the area may be excluded from focus restrictions and other group commands. It should be noted that in alternative embodiments, such operations may be performed in environments other than school classrooms. As an illustrative non-limiting example, the techniques described with reference to FIG. 19 may be used to provide documents and/or authorization to view such documents (e.g., a certificate or a decryption key) to devices that are located in a particular office building, in a particular conference room, etc.

In a particular embodiment, the systems and methods of the present disclosure enable a manager (e.g., a teacher) to group a sequence of commands together and create a "macro" that can be saved and executed on demand. For example, a teacher may define a macro that locks different groups of student devices to different apps and initiates screen mirroring, and the teacher may indicate that the macro is to be automatically executed at the start of class. The macro includes commands that focus a first group of student devices to an app, focus a second group of student devices to a different app, and initiate screen mirroring on a particular student device. When class starts, the teacher may select the macro for execution. Thus, the macro may enable the teacher to spend less time performing device management tasks during class, because the teacher may push a single button at the start of class to execute the macro instead of having to manually focus student device groups and initiate screen mirroring at the start of each class.

Alternatively, the macro can be configured to be automatically executed based on an event. For example, the teacher may configure the macro to automatically execute once class has started and it is determined which students are present in the classroom 1902 and which students are absent from the classroom 1902. At the designated time, the teacher device 1910 may communicate the commands of the macro to the server 1920. Alternatively, the macro may have previously been stored at the server 1920, and the server 1920 may transmit the notifications to the appropriate student devices at the designated time to restrict focus, initiate screen mirroring, etc.

It should be noted that the order of steps or operations described with reference to FIGS. 1-19 is to be considered illustrative, and not limiting. In alternate embodiments, the order of steps may be different. Further, one or more steps may be optional and/or replaced by other steps. In addition, one or more steps may be consolidated. For example, in particular embodiments the step 1802 may be optional (e.g., a rule may have been previously defined and the method 1800 may begin at 1804). In addition, one or more steps may be consolidated or performed at least partially concurrently.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a media player, one or more other computing devices, or any combination thereof. The computer system may be connected, e.g., using a network, to other computer systems or peripheral devices. For example, the computer system or components thereof can include or be included within any one or more of the manager mobile device 110 of FIG. 1, the MDM server 120 of FIG. 1, a computing device or server corresponding to the push notification service 130 of FIG. 1, the first managed mobile device 140 of FIG. 1, the second managed mobile device 150 of FIG. 1, the external display device 170 of FIG. 1, the device management server 1220 of FIG. 12, a computing device or server corresponding to the push notification service 1230 of FIG. 12, the managed computing device 1250 of FIG. 12, the teacher device 1910 of FIG. 19, the student device 1950 of FIG. 19, the server 1920 of FIG. 19, an output device that displays a GUI generated by one of the devices described herein, an input device that receives user input responsive to the GUI, and/or a device that includes the output device and the input device.

In a networked deployment, the computer system may operate in the capacity of a server or as a client user computer in a server-client user network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device (e.g., storage device). The terms "computer-readable device" and "processor-readable device" include a single storage device or multiple storage devices, such as a centralized or distributed memory, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable device is not a signal.

In a particular embodiment, a method includes receiving, at a manager mobile device, a selection of a managed mobile device of a plurality of managed mobile devices. The method also includes displaying, at the manager mobile device, a list of applications executable by the managed mobile device, a list of websites accessible by the managed mobile device, or both. The method further includes receiving, at the manager mobile device, a selection of an application from the list of applications or a selection of a website from the list of websites. The method includes initiating, at the manager mobile device, transmission of data to the managed mobile device instructing the managed mobile device to restrict focus to the selected application or the selected website.

In another particular embodiment, a method includes receiving, at a managed mobile device, data that indicates that the managed mobile device is to scan for a particular wireless beacon signal during a particular time period. The method also includes, in response to detecting that the particular time period has started, scanning one or more wireless frequencies for the particular wireless beacon signal. The method further includes, in response to receiving the particular wireless beacon signal from a manager mobile device: transmitting a message from the managed mobile device that the managed mobile device has received the particular wireless beacon signal and receiving, based at least part on the message, a command (e.g., from the manager mobile device or from a mobile device management (MDM) server) instructing the managed mobile device to perform at least one operation.

In another particular embodiment, a computer-readable storage device stores instructions that, when executed by a processor, cause the processor to perform operations including receiving data at a mobile device management (MDM) server from a manager mobile device. The data identifies a managed mobile device of a plurality of managed mobile devices and a command selected at the manager mobile device for execution at the managed mobile device. The operations also include initiating transmission of a push notification to the managed mobile device to cause the managed mobile device to retrieve the command.

In another particular embodiment, an apparatus includes a processor and a memory storing instructions that, when executed by the processor, cause the processor to perform operations including receiving, at a manager mobile device, a selection of a managed mobile device of a plurality of managed mobile devices. The operations also include displaying, at the manager mobile device, a list of applications executable by the managed mobile device, a list of websites accessible by the managed mobile device, or both. The operations further include receiving, at the manager mobile device, a selection of an application from the list of applications or a selection of a website from the list of websites. The operations include initiating, from the manager mobile device, transmission of data to the managed mobile device instructing the managed mobile device to restrict focus to the selected application or the selected website.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a manager mobile device, a selection of a managed mobile device of a plurality of managed mobile devices;
    displaying, at the manager mobile device, an icon that identifies a list of applications executable by the managed mobile device, a list of websites accessible by the managed mobile device, or both;
    receiving, at the manager mobile device, data indicating a selection of an application from the list of applications or data indicating a selection of a website from the list of websites; and
    sending a first message from the manager mobile device to a mobile device management (MDM) server to cause the MDM server to initiate transmission of a second message to the managed mobile device, the MDM server distinct from the manager mobile device and the managed mobile device, wherein the second message includes a command that causes the managed mobile device to restrict focus to the website, to restrict focus to the application, or both, includes configuration information to configure software associated with the managed mobile device based on a proximity of the managed mobile device to an access point (AP) associated with the MDM server, and includes a certificate to authenticate the managed mobile device at the AP.

2. The method of claim 1, wherein the second message is sent to the managed mobile device via an encrypted internet protocol (IP) connection, the second message is sent to the managed mobile device by a push notification service, or both, wherein the command causes the managed mobile device to restrict focus to the website by causing the managed mobile device to navigate via a browser application to the website, and wherein the second message includes data identifying a memory address.

3. The method of claim 2, wherein the command causes the managed mobile device to:
    navigate to the website,
    ignore user input at the managed mobile device that deactivates the browser application, and
    ignore user input at the managed mobile device that navigates away from the website.

4. The method of claim 1, wherein the command causes the managed mobile device to:
    activate the application,
    ignore user input at the managed mobile device that deactivates the application, and
    ignore user input at the managed mobile device that activates another application.

5. The method of claim 1, wherein the manager mobile device comprises a teacher device, and wherein each of the plurality of managed mobile devices comprises a student device.

6. The method of claim 1, further comprising receiving, at the manager mobile device, a selection of a second managed mobile device of the plurality of managed mobile devices.

7. The method of claim 1, further comprising displaying, at the manager mobile device, a second icon corresponding to a second managed mobile device, wherein the second icon is associated with a second list of second applications executable by the second managed mobile device, a second list of second websites accessible by the second managed mobile device, or both.

8. The method of claim 1, further comprising:
    receiving, at the manager mobile device, a selection of a clear passcode option; and
    initiating, from the manager mobile device, transmission of second data to the managed mobile device to clear a passcode at the managed mobile device.

9. The method of claim 1, further comprising:
    receiving, at the manager mobile device, a selection of a clear focus option; and
    initiating, from the manager mobile device, transmission of second data to the managed mobile device, wherein the second data instructs the managed mobile device to stop restricting focus to the selected application or the selected website.

10. The method of claim 1, further comprising automatically initiating, based on an end of a time period, transmission of second data to the managed mobile device, wherein the second data instructs the managed mobile device to stop restricting focus to the selected website.

11. The method of claim 1, further comprising:
    receiving, at the manager mobile device, a selection of a screen mirroring option and a particular managed mobile device; and
    sending a particular message from the manager mobile device to the particular managed mobile device, the particular message instructing the particular managed mobile device to initiate a screen mirroring session to a display device external to the plurality of managed mobile devices and external to the manager mobile device.

12. The method of claim 1, further comprising:
receiving, at the manager mobile device, a selection of a file; and
providing the file to the managed mobile device, wherein providing the file to the managed mobile device comprises sending the file to the managed mobile device or instructing the managed mobile device to download the file from an external source.

13. The method of claim 12, wherein the file corresponds to at least a portion of an electronic learning (e-learning) lesson, an image, a document, audio content, video content, an electronic book (eBook), or any combination thereof.

14. The method of claim 1, further comprising displaying, at the manager mobile device, a battery life status of the managed mobile device.

15. The method of claim 1, wherein the managed mobile device comprises a tablet computer, a laptop computer, a mobile phone, a portable media player, a book reader, or any combination thereof.

16. The method of claim 1, further comprising:
receiving, at the manager mobile device, data associated with the manager mobile device; and
configuring the manager mobile device as a wireless beacon based on the data.

17. The method of claim 16, wherein the data includes a universal unique identifier (UUID), a major value, a minor value, or any combination thereof.

18. The method of claim 16, further comprising transmitting a wireless beacon signal from the manager mobile device, wherein the wireless beacon signal includes a first identifier.

19. The method of claim 18, wherein the wireless beacon signal is transmitted by the manager mobile device during a first time period while the manager mobile device is in a first area, and further comprising transmitting a second wireless beacon signal including a second identifier during a second time period while the manager mobile device is in a second area, wherein the first identifier is determined based on at least one of the first time period or the first area, and wherein the second identifier is determined based on at least one of the second time period or the second area.

20. The method of claim 19, wherein the first area corresponds to a first room, and wherein the second area corresponds to a second room.

21. The method of claim 18, wherein the manager mobile device is located in a particular area, and further comprising receiving a list of managed mobile devices that are located in the particular area.

22. The method of claim 21, further comprising:
determining one or more devices not located in the particular area; and
excluding the one or more devices not located in the particular area from a focus restriction.

23. The method of claim 1, further comprising receiving, at the manager mobile device, user input that defines a sequence of commands that are to be automatically executed as a macro in response to a particular event.

24. A computer-readable storage device storing instructions that, when executed by a processor, cause the processor to perform operations comprising:
receiving, at a mobile device management (MDM) server from a manager mobile device, data identifying a managed mobile device of a plurality of managed mobile devices and a command selected at the manager mobile device for execution at the managed mobile device to cause the managed mobile device to navigate to a particular website via a browser application, wherein the MDM server is distinct from the manager mobile device and the managed mobile device;
transmitting a push notification from the MDM server to the managed mobile device to request retrieval of the command at the managed mobile device;
receiving, at the MDM server from the managed mobile device, an acknowledgment message responsive to the push notification, the acknowledgment message indicating that the managed mobile device retrieved the command;
receiving, at the MDM server, a message from the managed mobile device, wherein the message is distinct from the acknowledgment message and indicates that the managed mobile device detected a wireless beacon associated with a location of the managed mobile device; and
in response to receiving the message, transmitting, from the MDM server, a second message to the managed mobile device, wherein the second message includes second data associated with rules for managing the managed mobile device based on the location of the managed mobile device, the second data stored in a regions rule database in a memory of the MDM server.

25. The computer-readable storage device of claim 24, wherein the command comprises a particular command to:
restrict focus at the managed mobile device to a particular application,
restrict focus at the managed mobile device to the particular website,
clear a passcode at the managed mobile device,
stop restricting focus at the managed mobile device,
initiate a screen mirroring session from the managed mobile device to an external display device, or
obtain a document at the managed mobile device.

26. The computer-readable storage device of claim 24, wherein the second data includes first information to enable the managed mobile device to access a wireless access point associated with the MDM server, wherein the second data includes second information to enable the managed mobile device to access a wireless printer associated with the MDM server, and wherein the operations further comprise sending to the manager mobile device a list of applications executable at the managed mobile device, a list of websites accessible by the managed mobile device, or a combination thereof.

27. The computer-readable storage device of claim 24, wherein the operations further comprise storing grouping data that classifies at least a subset of the managed mobile devices into a group, and wherein the operations further comprise retrieving, from the memory of the MDM server, the second data based on the location of the managed mobile device.

28. An apparatus comprising:
a processor; and
a memory storing instructions that, when executed by the processor, cause the processor to perform operations comprising:
receiving, at a manager mobile device, a selection of a managed mobile device of a plurality of managed mobile devices;
displaying, at the manager mobile device, an icon that identifies a list of applications executable by the managed mobile device, a list of websites accessible by the managed mobile device, or both;

receiving, at the manager mobile device, a selection of an application from the list of applications or a selection of a website from the list of websites; and sending a first message from the manager mobile device to a mobile device management (MDM) server to cause the MDM server to send a second message to the managed mobile device, the MDM server distinct from the manager mobile device and the managed mobile device, wherein the second message includes a command that causes the managed mobile device to restrict focus to the website, to restrict focus to the application, or both, includes configuration information to configure software associated with the managed mobile device based on a proximity of the managed mobile device to an access point (AP) associated with the MDM server, and includes a certificate to authenticate the managed mobile device at the AP.

29. The apparatus of claim 28, further comprising a touchscreen display coupled to the processor, the touchscreen display configured to receive the selection of the managed mobile device and further configured to receive the selection of the application or the selection of the website.

30. The apparatus of claim 29, further comprising a wireless networking interface coupled to the processor, the wireless networking interface configured to send the first message.

* * * * *